US012402090B2

(12) United States Patent
Liu et al.

(10) Patent No.: US 12,402,090 B2
(45) Date of Patent: Aug. 26, 2025

(54) DYNAMIC SYNCHRONIZATION SIGNAL BLOCKS FOR SIDELINK COMMUNICATION

(71) Applicant: QUALCOMM Incorporated, San Diego, CA (US)

(72) Inventors: Chih-Hao Liu, San Diego, CA (US); Jing Sun, San Diego, CA (US); Tao Luo, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 17/659,293

(22) Filed: Apr. 14, 2022

(65) Prior Publication Data

US 2023/0337155 A1      Oct. 19, 2023

(51) Int. Cl.
*H04W 56/00* (2009.01)
*H04W 72/1263* (2023.01)
*H04W 72/20* (2023.01)
*H04W 74/0816* (2024.01)
*H04W 92/18* (2009.01)

(52) U.S. Cl.
CPC ..... *H04W 56/001* (2013.01); *H04W 72/1263* (2013.01); *H04W 72/20* (2023.01); *H04W 74/0816* (2013.01); *H04W 92/18* (2013.01)

(58) Field of Classification Search
CPC ........... H04W 56/001; H04W 72/1263; H04W 72/20; H04W 74/0816; H04W 92/18; H04W 72/04; H04W 76/14; H04L 7/00; H04L 7/0008
See application file for complete search history.

(56) References Cited

U.S. PATENT DOCUMENTS

| 2017/0272299 | A1* | 9/2017 | Chae ...................... H04L 5/0048 |
| 2018/0234931 | A1* | 8/2018 | Ly .......................... H04W 72/30 |
| 2020/0059927 | A1* | 2/2020 | Sun .................... H04W 56/0015 |
| 2021/0051610 | A1* | 2/2021 | Akkarakaran ........ H04W 56/00 |
| 2021/0076341 | A1* | 3/2021 | Si ............................ H04L 5/001 |
| 2022/0264476 | A1* | 8/2022 | Kim .................... H04W 52/383 |
| 2022/0399917 | A1* | 12/2022 | Shin ..................... H04B 17/318 |

FOREIGN PATENT DOCUMENTS

| WO | WO-2019143937 A1 | * | 7/2019 | |
| WO | WO 2023028969 | * | 9/2021 | .............. H04W 4/06 |

* cited by examiner

*Primary Examiner* — Ricky Q Ngo
*Assistant Examiner* — David M Kayal
(74) *Attorney, Agent, or Firm* — Arun Swain

(57) ABSTRACT

Wireless communications systems, apparatuses, and methods are provided. A method of wireless communication performed by a first sidelink user equipment (UE) may include transmitting, to a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst and transmitting, to the second sidelink UE, the S-SSB burst based on the at least one of the length associated with the S-SSB burst, the QCL index associated with the S-SSB burst, or the first QCL order associated with the S-SSB burst.

26 Claims, 12 Drawing Sheets

S-SSB 305

PSCCH Resources 315

PSSCH Resources 310

AGC Symbol 320

DYNAMIC SYNCHRONIZATION SIGNAL BLOCKS FOR SIDELINK COMMUNICATION

TECHNICAL FIELD

This application relates to wireless communication systems, and more particularly, to dynamic sidelink synchronization signal blocks (S-SSBs) for sidelink communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include transmitting, to a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst and transmitting, to the second sidelink UE, the S-SSB burst based on the at least one of the length associated with the S-SSB burst, the QCL index associated with the S-SSB burst, or the first QCL order associated with the S-SSB burst.

In an additional aspect of the disclosure, a method of wireless communication performed by a first sidelink user equipment (UE) may include receiving, from a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst and receiving, from the second sidelink UE, the S-SSB burst based on the at least one of the length associated with the S-SSB burst, the QCL index associated with the S-SSB burst, or the QCL order associated with the S-SSB burst.

In an additional aspect of the disclosure, a first sidelink user equipment (UE) may include a memory; a transceiver; and at least one processor coupled to the memory and the transceiver, wherein the first sidelink UE is configured to transmit, to a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst and transmit, to the second sidelink UE, the S-SSB burst based on the at least one of the length associated with the S-SSB burst, the QCL index associated with the S-SSB burst, or the first QCL order associated with the S-SSB burst.

In an additional aspect of the disclosure, a first sidelink user equipment (UE) may include a memory; a transceiver; and at least one processor coupled to the memory and the transceiver, wherein the first sidelink UE is configured receive, from a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst and receive, from the second sidelink UE, the S-SSB burst based on the at least one of the length associated with the S-SSB burst, the QCL index associated with the S-SSB burst, or the QCL order associated with the S-SSB burst.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed

DETAILED DESCRIPTION

Figure 1:
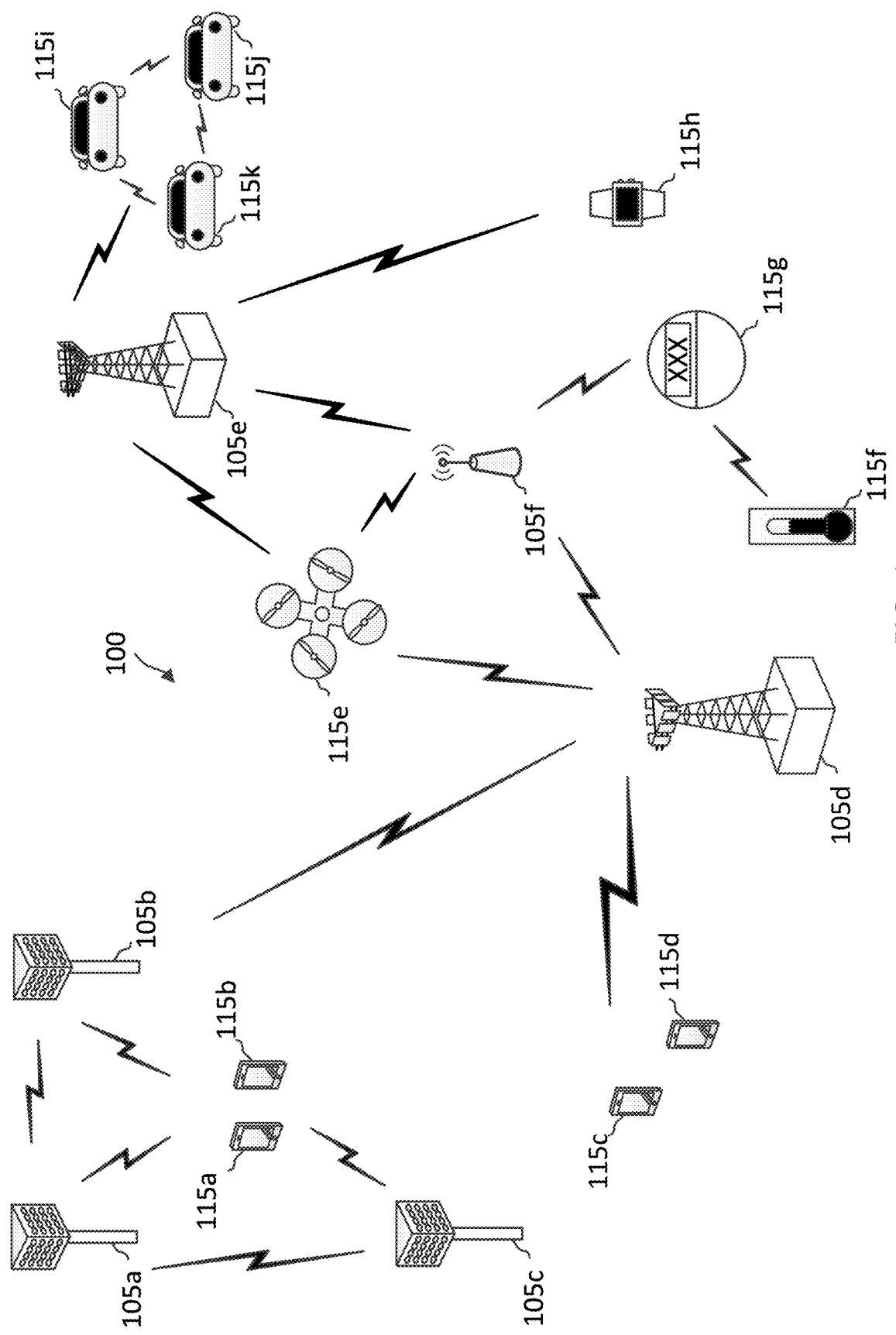
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about 70 percent (%).

Some sidelink systems may operate over a 20 MHz bandwidth in an unlicensed band. ABS may configure a sidelink resource pool over the 20 MHz band for sidelink communications. A sidelink resource pool is typically partitioned into multiple frequency subchannels or frequency subbands (e.g., about 5 MHz each) and a sidelink UE may select a sidelink resource (e.g., a subchannel) from the sidelink resource pool for sidelink communication. To satisfy an OCB of about 70%, a sidelink resource pool may utilize a frequency-interlaced structure. For instance, a frequency-interlaced-based sidelink resource pools may include a plurality of frequency interlaces over the 20 MHz band, where each frequency interlace may include a plurality of resource blocks (RBs) distributed over the 20 MHz band. For example, the plurality of RBs of a frequency interlace may be spaced apart from each other by one or more other RBs in the 20 MHz unlicensed band. A sidelink UE may select a sidelink resource in the form of frequency interlaces from the sidelink resource pool for sidelink communication. In other words, sidelink transmissions may utilize a frequency-interlaced waveform to satisfy an OCB of the unlicensed band. However, S-SSBs may be transmitted in a set of contiguous RBs, for example, in about eleven contiguous RBs. As such, S-SSB transmissions alone may not meet the OCB requirement of the unlicensed band. Accordingly, it may be desirable for a sidelink sync UE to multiplex an S-SSB transmission with one or more channel state information reference signals (CSI-RSs) in a slot configured for S-SSB transmission so that the sidelink sync UE's transmission in the slot may comply with an OCB requirement.

The present application describes mechanisms for a sidelink UE to multiplex an S-SSB transmission with a CSI-RS transmission in a frequency band to satisfy an OCB of the frequency band. For instance, the sidelink UE may determine a multiplex configuration for multiplexing a CSI-RS transmission with an S-SSB transmission in a sidelink BWP. The sidelink UE may transmit the S-SSB transmission in the sidelink BWP during a sidelink slot. The sidelink UE may transmit one or more CSI-RSs in the sidelink BWP during the sidelink slot by multiplexing the CSI-RS and the S-SSB transmission based on the multiplex configuration.

In some aspects, the sidelink UE may transmit the S-SSB transmission at an offset from a lowest frequency of the sidelink BWP based on a synchronization raster (e.g., an NR-U sync raster). In some aspects, the sidelink UE may transmit the S-SSB transmission aligned to a lowest frequency of the sidelink BWP. For instance, a sync raster can be defined for sidelink such that the S-SSB transmission may be aligned to a lowest frequency of the sidelink BWP.

In some aspects, the multiplex configuration includes a configuration for multiplexing the S-SSB transmission with a frequency interlaced waveform sidelink transmission to meet the OCB requirement. For instance, the sidelink transmission may include a CSI-RS transmission multiplexed in frequency within a frequency interlace with RBs spaced apart in the sidelink BWP. In some instances, the sidelink UE may rate-match the CSI-RS transmission around RBs that are at least partially overlapping with the S-SSB transmission.

In some aspects, the multiplex configuration includes a configuration for multiplexing the S-SSB transmission with a subchannel-based sidelink transmission to meet the OCB requirement. For instance, the sidelink transmission may include a CSI-RS transmission multiplexed in time within a subchannel including contiguous RBs in the sidelink BWP. For instance, the S-SSB transmission may be transmitted at a low frequency portion of the sidelink BWP, and the CSI-RS may be transmitted in a subchannel located at a high frequency portion of the sidelink BWP to meet the OCB.

In some aspects, a BS may configure different sidelink resource pools for slots that are associated with S-SSB transmissions and for slots that are not associated with S-SSB transmissions. For instance, the BS may configure a first resource pool with a frequency-interlaced structure for slots that are not configured for S-SSB transmissions. The first resource pool may include a plurality of frequency interlaces (e.g., distributed RBs), where each frequency interlace may carry a PSCCH/PSSCH transmission. The BS may configure a second resource pool with a subchannel-based structure for slots that are configured for S-SSB transmission. The second resource pool may include a plurality of frequency subchannels (e.g., contiguous RBs), where each subchannel may carry a PSCCH/PSSCH transmission. To satisfy an OCB in a sidelink slot configured for an S-SSB transmission, the sidelink UE (e.g., a sidelink sync UE) may transmit an S-SSB transmission multiplexed with a CSI-RS transmission. For instance, the S-SSB transmission may be transmitted in frequency resources located at a lower frequency portion of a sidelink BWP and the CSI-RS transmission may be transmitted in frequency resources located at higher frequency portion of the sidelink BWP.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115$a$-115$d$ are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115$e$-115$h$ are examples of various machines configured for communication that access the network 100. The UEs 115$i$-115$k$ are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V21) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115*k* may transmit a configuration to the UE 115*j* indicating at least one of a length associated with a sidelink synchronization signal block (S-SSB) burst, a quasi-colocation (QCL) index associated with the S-SSB burst, or a first QCL order associated with the S-SSB burst. In some aspects, the UE 115*k* may transmit the S-SSB burst to the UE 115*j* based on the at least one of the length associated with the S-SSB burst, the QCL index associated with the S-SSB burst, or the first QCL order associated with the S-SSB burst.

Figure 2:
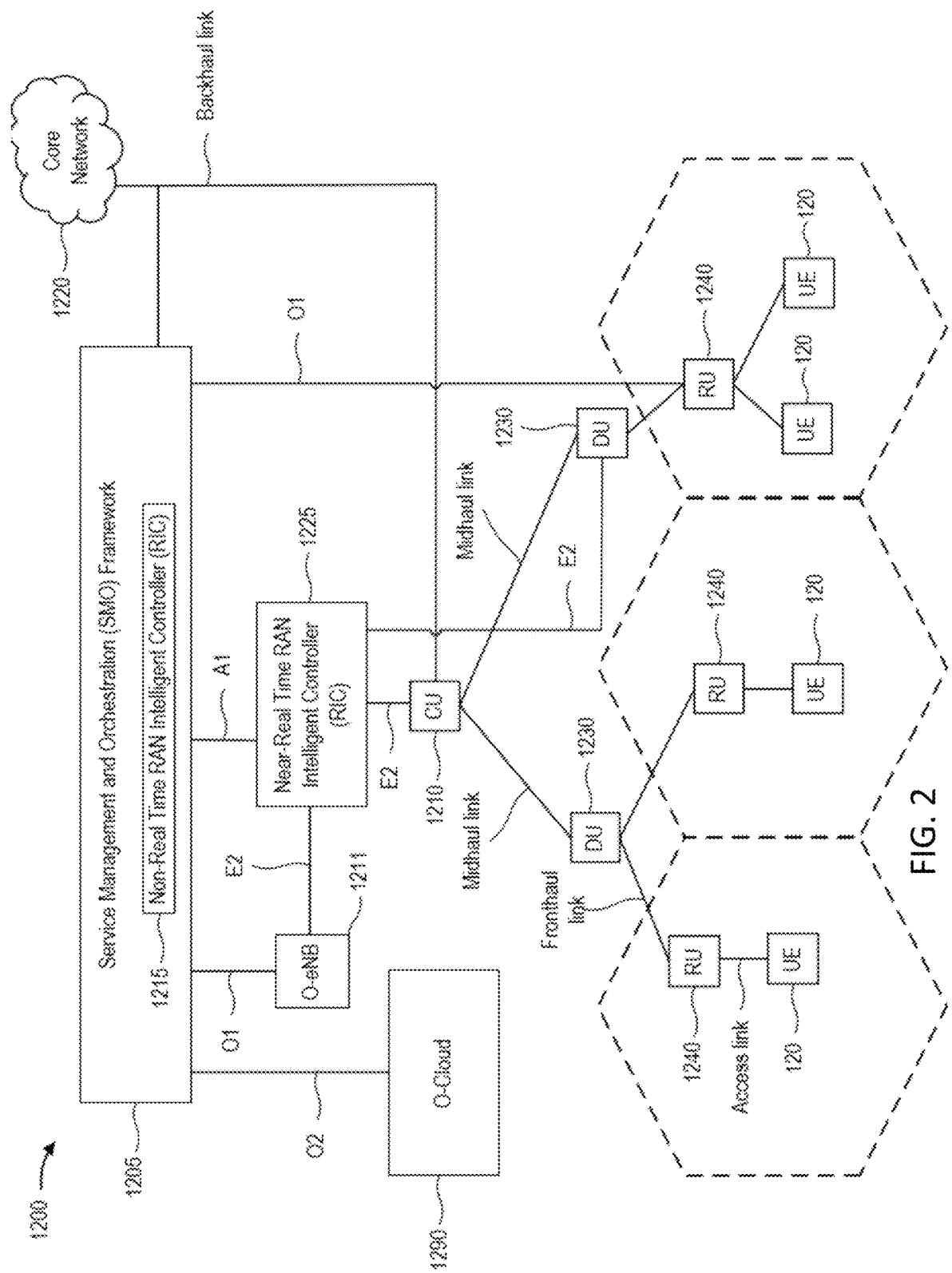
FIG. 2 illustrates an example disaggregated base station architecture according to some aspects of the present disclosure

FIG. 2 shows a diagram illustrating an example disaggregated base station 1200 architecture. The disaggregated base station 1200 architecture may include one or more central units (CUs) 1210 that can communicate directly with a core network 1220 via a backhaul link, or indirectly with the core network 1220 through one or more disaggregated base station units (such as a Near-Real Time (Near-RT) RAN Intelligent Controller (MC) 1225 via an E2 link, or a Non-Real Time (Non-RT) RIC 1215 associated with a Service Management and Orchestration (SMO) Framework 1205, or both). A CU 1210 may communicate with one or more distributed units (DUs) 1230 via respective midhaul links, such as an F1 interface. The DUs 1230 may communicate with one or more radio units (RUs) 1240 via respective fronthaul links. The RUs 1240 may communicate with respective UEs 120 via one or more radio frequency (RF) access links. In some implementations, the UE 120 may be simultaneously served by multiple RUs 1240.

Each of the units, i.e., the CUs 1210, the DUs 1230, the RUs 1240, as well as the Near-RT RICs 1225, the Non-RT RICs 1215 and the SMO Framework 1205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (i.e., Central Unit-User Plane (CU-UP)), control plane functionality (i.e., Central Unit-Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1230 may further host one or more low PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 120. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

In some aspects, a method of wireless communication may be performed by the UE 120. The method may include monitoring a first set of physical downlink control channel (PDCCH) candidate resources for a PDCCH communication from the RU 1240, receiving, from the RU 1240, a plurality of demodulation reference signals (DMRSs) and decoding, based on a metric associated with the plurality of demodulation reference signals (DMRSs) satisfying a threshold, the PDCCH communication.

In some aspects, a first UE 120 may transmit a configuration to a second UE 120 indicating at least one of a length associated with a sidelink synchronization signal block (S-SSB) burst, a quasi-colocation (QCL) index associated with the S-SSB burst, or a first QCL order associated with the S-SSB burst. In some aspects, the first UE 120 may transmit the S-SSB burst to the second UE 120 based on the at least one of the length associated with the S-SSB burst, the QCL index associated with the S-SSB burst, or the first QCL order associated with the S-SSB burst.

Figure 3:
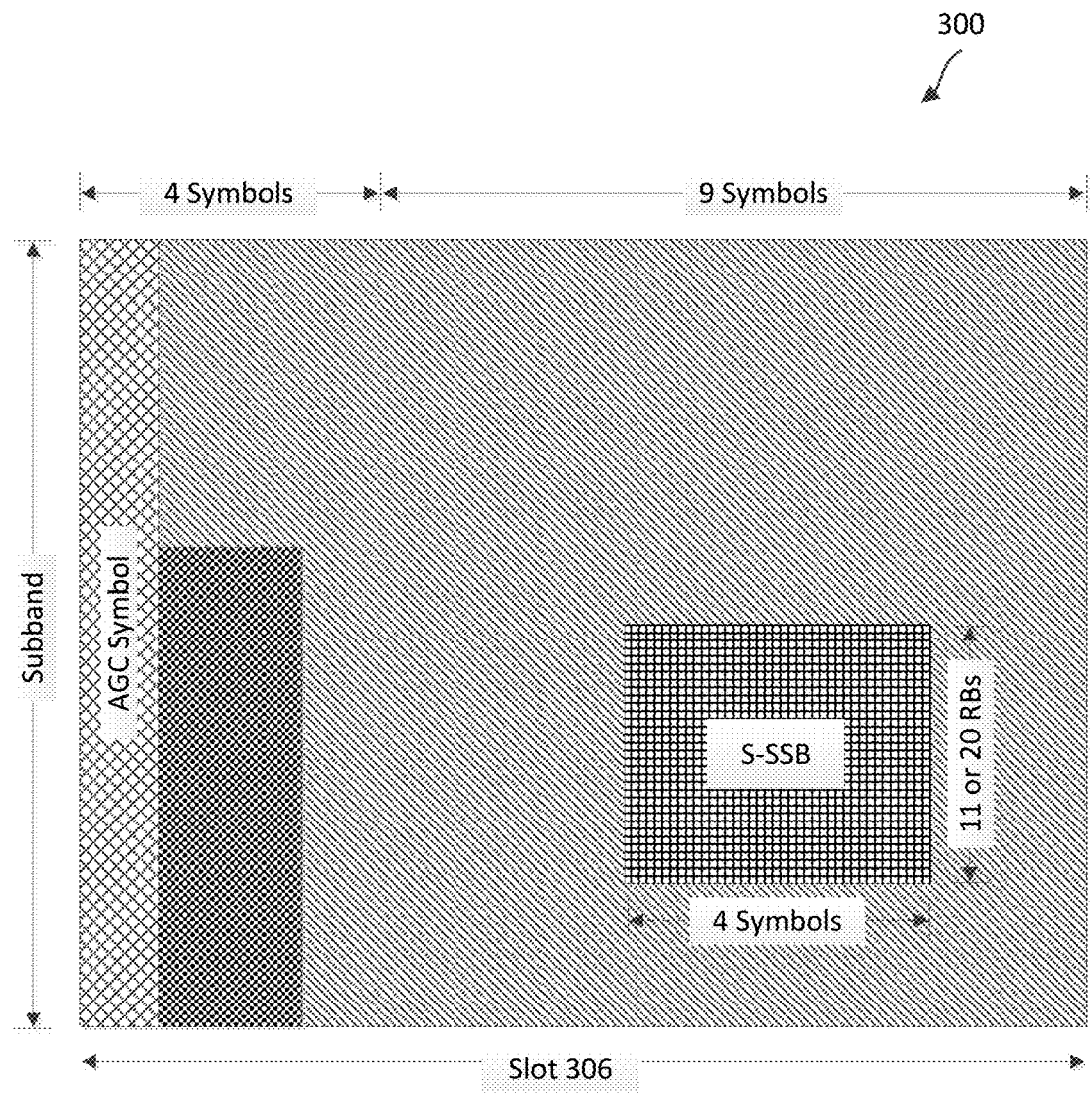
FIG. 3 illustrates an example of a resource configuration that supports dynamic S-SSBs according to some aspects of the present disclosure.
Figure 3:
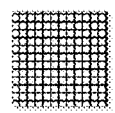
Figure 3:
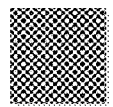
Figure 3:
Figure 3:
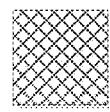

FIG. 3 illustrates an example of a resource configuration 300 that supports dynamic S-SSB bursts in accordance with some aspects of the present disclosure. The resource configuration 300 may be implemented by aspects of the wireless communications network 100 and/or the wireless communications network 1200. For example, the resource configuration 300 may be implemented for sidelink communications by one or more UEs, (e.g., UE 115, UE 120, or UE 900) such as described by the wireless communications network 100 and/or 200. The resource configuration 300 may support the use of a dynamic S-SSB burst transmitted by the UE 115 based on at least one of the length associated with the S-SSB burst, the QCL index associated with the S-SSB burst, and/or the first QCL order associated with the S-SSB burst.

The resource configuration 300 may include time-frequency resources for one or more transmission types. For example, the resource configuration 300 may include time-frequency resources for an S-SSB 305. In some aspects, a UE 115 may transmit one or more S-SSBs 305 in an S-SSB burst. The resource configuration 300 may be a representation of time-frequency resources and/or transmissions using time-frequency resources. For example, S-SSB 305 may be an example of a transmission or time-frequency resources for the transmission.

In some aspects, the UE 115 may multiplex an S-SSB 305 with PSSCH resources 310. For example, a portion of PSSCH resources 310 may overlap with the S-SSB 305. The UE 115 may multiplex the S-SSB 305 with the PSSCH resources 310 to satisfy an occupied channel bandwidth (OCB) threshold, where the multiplexed signaling may fill at least a percentage (e.g., 80%) of a frequency channel (e.g., a 20 MHz channel). The UE 115 may transmit the S-SSB 305 using a quantity of symbols and a quantity of resource blocks (RBs). For example, the UE 115 may transmit the S-SSB 305 using 4 symbols and 11 RBs. In some aspects, the UE 115 may transmit the S-SSB 305 using 4 symbols and 20 RBs. The UE 115 may select time-frequency resources for the S-SSB 305 that do not overlap with a quantity of time-frequency resources that are configured for other types of signaling. For example, the UE 115 may select four symbols for transmitting the S-SSB 305, which may be different from an initial four symbols of a slot 306.

In some aspects, the UE 115 may select one or more time-frequency resources for the S-SSB 305 to avoid one or more time-frequency resources for other transmissions. For example, the UE 115 may select one or more time-frequency resources for the S-SSB 305, which may be different from PSCCH resources 315. Additionally, or alternatively, the UE 115 may select one or more time-frequency resources for the S-SSB 305, which may be different from an AGC symbol 320. In some aspects, the AGC symbol 320 may span a sub-band. In some cases, PSCCH resources 315 may span a portion of a sub-band. Additionally, or alternatively, the S-SSB 305 may span a portion of a sub-band. In some cases, the UE 115 may select one or more time-frequency resources for the S-SSB 305, which may be different from PSCCH resource 315, so that PSCCH decoding is not impacted by the S-SSB 305.

In some cases, the UE 115 may multiplex the S-SSB 305 and PSSCH resources 310 within a sub-band. For example, the S-SSB 305 and the PSSCH resources 310 may be included in a single sub-band, which may be an example of a 20 MHz subchannel. Additionally, or alternatively, the sub-band (e.g., subchannel) may include the AGC symbol 320 and the PSCCH resources 315. The sub-band may be an example of a sub-band or a channel of an unlicensed frequency spectrum (e.g., a shared spectrum). In some other cases, the sub-band may be an example of a sub-band or a channel of a licensed frequency spectrum.

The UE 115 may transmit control signaling, which may indicate one or more time-frequency resources associated with the S-SSB 305 (e.g., a location of the S-SSB 305). For example, the UE 115 may transmit an SCI (e.g., an SCI-1 and/or an SCI-2) message, which may indicate a sub-band for the S-SSB 305. In some aspects, the SCI message may indicate one or more symbols for the S-SSB 305. Additionally, or alternatively, the SCI message may indicate one or more slots 306 for the S-SSB 305. Additionally, or alternatively, the SCI message may indicate the length associated with the S-SSB burst, the QCL index associated with the S-SSB burst, or the first QCL order associated with the S-SSB burst. In some aspects, the SCI message may be an SCI-1 message. In some aspects, the UE 115 may transmit an indication of one or more RBs for the SSB-305 via master information block (MIB) signaling, remaining system information (RMSI) signaling, radio resource control (RRC) signaling, or any combination thereof.

In some aspects, a UE 115 may perform one or more rate matching operations associated with the S-SSB 305. For example, the UE 115 may rate match PSCCH resources 315 around the S-SSB 305. In some aspects, the UE 115 may rate match any combination of PSCCH resources 315, SCI (e.g., SCI-2), and/or DMRS resources around the S-SSB 305. In some aspects, the UE 115 may transmit an SCI message, which may include a bit indicating if the S-SSB 305 is included in a sub-band. A UE 115 may receive the SCI message and determine if one or more rate matching operations is associated with the S-SSB 305 based on the bit indicating if the S-SSB 305 is included in the sub-band.

Although FIG. 3 shows a particular location of the S-SSB 305, the S-SSB 305 may be located at a variety of other locations. For example, a UE 115 may transmit the S-SSB 305 using any four symbols of the slot 306. The four S-SSB symbols may be contiguous symbols. In some aspects, the slot 306 may include 14 symbols (e.g., 13 symbols and a gap symbol). A UE 115 may transmit the S-SSB 305 using symbols five through eight of the slot 306. Additionally, or alternatively, the UE 115 may transmit the S-SSB 305 using symbols ten through thirteen. Similarly, the UE 115 may transmit the S-SSB 305 using any combination of 11 or 20 RBs within the sub-band. The 11 or 20 RBs may be contiguous RBs.

In some aspects, the UE 115 may transmit wideband signaling, which may include multiple sub-bands. In some aspects, the UE 115 may transmit the S-SSB 305 using one or more sub-bands of a plurality of sub-bands (e.g., one or more sub-bands of a wideband transmission). In such aspects, the UE 115 may transmit control information (e.g., an SCI-1 and/or an SCI-2 message) within the PSCCH resources 315, and the control information may indicate which one or more sub-bands of the plurality of sub-bands includes the S-SSB 305. In some aspects, the control information may indicate the one or more sub-bands of the plurality of sub-bands. In some aspects, the control information may include a bitmap, which may indicate the one or more sub-bands including the S-SSB 305. The bitmap may include a first bit, which may indicate the leading sub-band containing the control information (e.g., the SCI-1). Additionally, or alternatively, the bitmap may include a second bit, which may indicate an additional sub-band (e.g., a subsequent sub-band) containing the control information. In some aspects, the wideband signaling may include four or five sub-bands. In some other aspects, the wideband signaling may include less than four sub-bands or greater than five sub-bands.

A UE 115 may transmit the S-SSB 305 using one sub-band. In such aspects, the UE 115 may transmit a message including a sub-band index field, which may indicate which sub-band includes the S-SSB 305. A value of the sub-band index field may indicate the absence of the S-SSB 305 in slot 306 (e.g., in a slot 306 of one or more sub-bands that do not include an S-SSB 305). In some aspects, the sub-band index may be a relative index. In some aspects, the control information carrying sub-band may be associated with a modulo operation. Additionally, or alternatively, the sub-band index may be an absolute index (e.g., within a four sub-band grid or a five sub-band grid). In some aspects, a UE 115 may transmit the S-SSB 305 using a same sub-band including SCI (e.g., SCI-1). In such aspects, a bit (e.g., a single bit) may indicate which sub-band includes the S-SSB 305 (e.g., the same sub-band in which the SCI was received).

Figure 4:
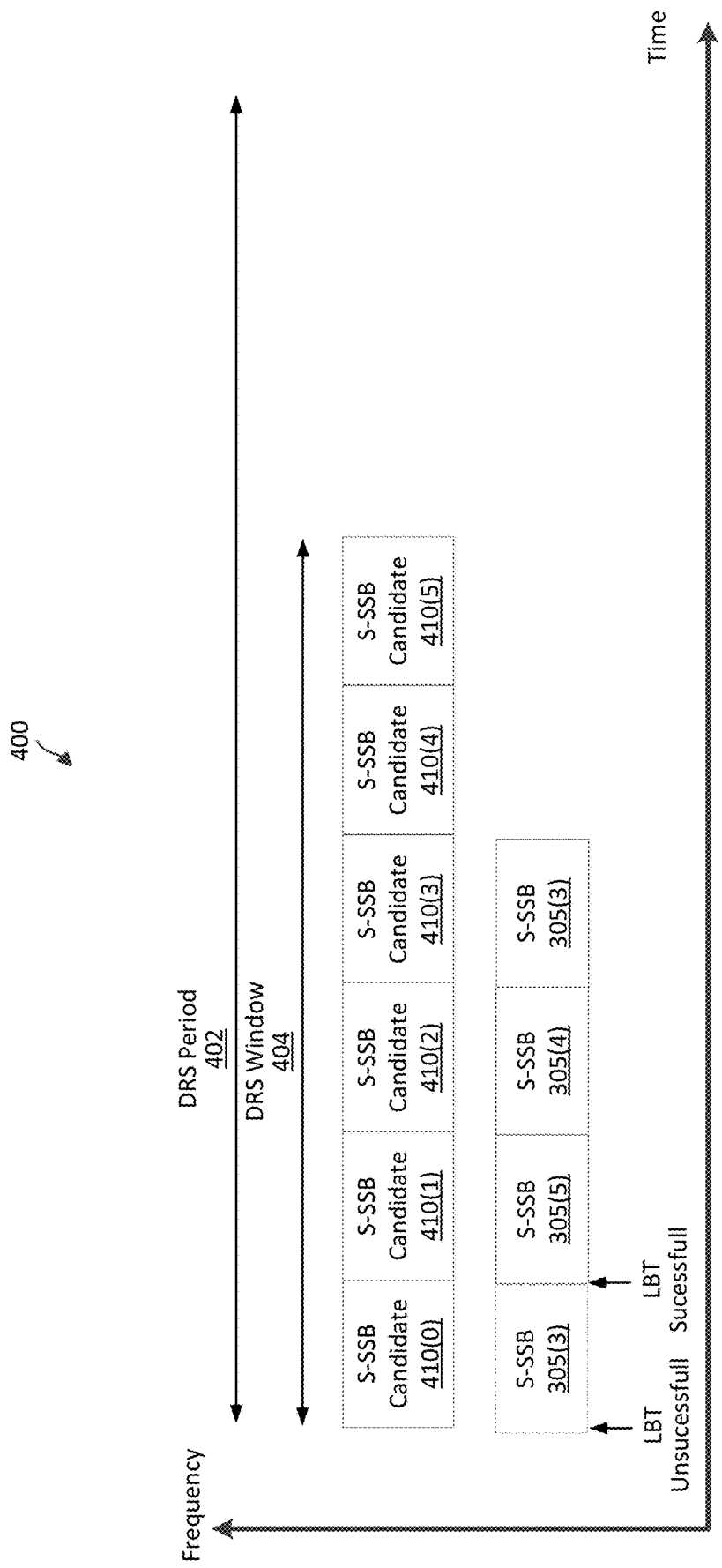
FIG. 4 illustrates an example of a resource configuration that supports contiguous S-SSB bursts according to some aspects of the present disclosure.

FIG. 4 illustrates an example of a resource configuration 400 that supports contiguous sidelink synchronization signal block (S-SSB) 305 bursts according to some aspects of the present disclosure. In FIG. 4, the x-axis represents time in some arbitrary units. The x-axis represents frequency in some arbitrary units. In some aspects, a first sidelink UE (e.g., the UE 115, the UE 120, or the UE 900) may transmit a configuration to a second sidelink UE (e.g., the UE 115, the UE 120, or the UE 900). The configuration may indicate at least one of a length associated with a S-SSB burst, a quasi-colocation (QCL) index associated with the S-SSB 305 burst, and/or a first QCL order associated with the S-SSB 305 burst. In this regard, the first sidelink UE may transmit the configuration to the second sidelink UE via a PC5 communication, sidelink control information (e.g., SCI-1, SCI-2), a radio resource control (RRC) communication, or other suitable communication. Additionally or alternatively, the first sidelink UE may receive the configuration from a network unit (e.g., the BS 105, the CU 1210, the DU 1230, the RU 1240, and/or the network unit 1000) via downlink control information (DCI), a radio resource control (RRC) communication, or other suitable communication. The first sidelink UE may transmit (e.g., forward) the configuration received from the network unit to the second sidelink UE.

In some aspects, the configuration may indicate a length associated with the S-SSB 305 burst. In this regard, the length associated with the S-SSB burst may indicate a number of contiguous slots associated with the S-SSB burst. For example, in FIG. 4 the configuration may indicate a length of 3 slots associated with S-SSB 305(5), S-SSB 305(4) and S-SSB 305(3). Additionally or alternatively, the configuration may indicate a length of 1, 2, 3, 4, 5, or more slots or sub-slots associated with the S-SSB 305 burst. A slot may be partitioned into multiple sub-slots. Each sub-slot may include a number of symbols (e.g., 1, 2, 3, 4, or more symbols). Additionally or alternatively, the configuration may indicate a length of 1, 2, 3, 4, 5, or more symbols associated with the S-SSB 305 burst. The slots associated with the S-SSB 305 burst may be contiguous in time and have consecutive slot indexes (e.g., slot index i, i+1, i+2) corresponding to S-SSB 305(5) indicating QCL index 5, S-SSB 305(4) indicating QCL index 4 and S-SSB 305(3) indicating QCL index 3. In some aspects, the length associated with the S-SSB 305 burst may be based on a number of UEs the first sidelink UE is scheduled to transmit the S-SSB 305 burst to.

In some aspects, the first sidelink UE may schedule communications (e.g., transport blocks) to be transmitted to a number of UEs (e.g., 1, 2, 3, 4, 5, or more UEs). The number of UEs may include the second sidelink UE. For example, the first sidelink UE may schedule communications to the second sidelink UE and a third sidelink UE. The first sidelink UE may establish radio links with the second sidelink UE and the third sidelink UE based on transmitting an initial S-SSB 305 burst(s) to the second sidelink UE and the third sidelink UE. The length of the S-SSB 305 burst may include three contiguous slots (e.g., slot index i, i+1, i+2) corresponding to S-SSB 305(5), S-SSB 305(4) and S-SSB 305(3). The first sidelink UE may transmit an S-SSB 305(5) burst to the second sidelink UE via the first slot, transmit an S-SSB 305(4) burst to the third sidelink UE via the second slot (e.g., contiguous to the first slot), and transmit an S-SSB 305(3) burst to the fourth sidelink UE via the third slot (e.g., contiguous to the second slot) to establish radio links with the first sidelink UE. By setting the length associated with the S-SSB burst(s) based on the number of UEs the first sidelink UE is scheduled to communicate with, the first sidelink UE may conserve resources (e.g., power resources, computing resources) as compared to transmitting S-SSB 305 bursts to UEs that the first sidelink UE is not scheduled to communicate with. Further, by setting the length associated with the S-SSB 305 burst based on the number of UEs the first sidelink UE is scheduled to communicate with, the first sidelink UE may reduce potential radio interference in the wireless network (e.g., wireless network 100 or 1200). Although the example above describes transmitting an S-SSB 305 burst to the second sidelink UE in a single slot, transmitting an S-SSB 305 to the third sidelink UE in a single slot, and transmitting an S-SSB 305 to the fourth sidelink UE in a single slot, the present disclosure is not so limited and the first sidelink UE may transmit any number of S-SSB 305 bursts via any number of slots to the second sidelink UE, the third sidelink UE and/or to the fourth sidelink UE.

In some aspects, the configuration may indicate a QCL index associated with the S-SSB 305 burst. In some aspects, the QCL index associated with the S-SSB 305 burst may indicate a beam associated with the S-SSB 305 burst. In this regard, the first sidelink UE may transmit the S-SSB 305 burst via a beam in the direction of the second sidelink UE. The first sidelink UE may be configured to transmit S-SSB 305 bursts via multiple directional beams (e.g., 1, 2, 4, 8, or more directional beams). The QCL index may correspond to the directional beam. For example, when the first sidelink UE is configured to transmit in 8 directional beams, the QCL index may have a value between 0 and 7. The QCL index may correspond to the directional beam that provides the highest radio link quality (e.g., highest reference signal received power (RSRP)) at the second sidelink UE. The second sidelink UE may measure one or more suitable beam parameters that may be reported to the first sidelink UE. The second sidelink UE may transmit a channel state information (CSI) report associated with the directional beam that provides the highest radio link quality to the first sidelink UE. The CSI report may indicate which beamformed S-SSB 305 burst(s) have resulted in the highest received power based on the measurements. The second sidelink UE may receive the S-SSB 305 burst(s), and derive carrier frequency and slot timing from the S-SSB 305 burst(s). By transmitting the S-SSB 305 to the second sidelink UE via the directional beam that provides the highest link quality, the first sidelink UE may increase the probability of establishing and/or maintaining the radio link between the first and second sidelink UEs as compared to transmitting the S-SSB 305 to the second sidelink UE via a directional beam that provides lower link quality.

In some aspects, the first sidelink UE may indicate the QCL index of the S-SSB 305 burst to the second sidelink UE (and other sidelink UEs) in the same slot as the S-SSB 305 burst. In this regard, the first sidelink UE may transmit the configuration indicating the QCL index of the S-SSB 305 burst to the second sidelink UE via SCI (e.g., SCI-1 and/or SCI-2) in symbols having lower indexes than the symbols in which the S-SSB 305 burst is transmitted. For example, the first sidelink UE may transmit the configuration indicating the QCL index of the S-SSB 305 burst in symbol indexes 1, 2, or 3 while transmitting the S-SSB 305 burst in symbols having higher indexes (e.g., any of symbol indexes 4-13).

In some aspects, the first sidelink UE may transmit the configuration comprising the QCL index associated with the S-SSB 305 burst as a codepoint via a physical sidelink broadcast channel (PSBCH). For example, the first sidelink UE may transmit the configuration comprising the QCL index as a codepoint via a PSBCH demodulation reference signal (DMRS) scrambling sequence. The codepoint be a binary number (e.g., 1, 2, 3, 4, or more bits) representing the QCL index. Additionally or alternatively, the first sidelink UE may transmit the configuration comprising the QCL index as a codepoint via a PSBCH payload.

In some aspects, the first sidelink UE may perform a listen-before-talk (LBT) or other clear channel assessment (CCA) prior to transmitting an S-SSB 305 burst. As shown in FIG. 4, if the first sidelink UE performs an LBT before attempting to transmit the S-SSB 305(3) burst to the second sidelink UE using beam index 3, the LBT may fail. The failure of the LBT may prevent the first sidelink UE from accessing the channel and transmitting the S-SSB 305(3) to the second sidelink UE using beam index 3 as indicated by the dashed line in S-SSB 305(3). The first sidelink UE may perform another LBT before attempting to transmit the S-SSB 305(5) burst to the third sidelink UE using beam index 5. If the LBT is successful, then the first sidelink UE may proceed with transmitting the S-SSB 305(5) burst to the third sidelink UE using beam index 5, then transmit another S-SSB 305(4) burst to the fourth sidelink UE using beam index 4, and then transmit another S-SSB 305(3) burst to the second sidelink UE using beam index 3. In this manner, the UE may dynamically change the order of the S-SSB bursts based on whether the LBT is successful or unsuccessful. By dynamically changing the order of the S-SSB bursts to 5, 4, 3 from 3, 5, 4, the first sidelink UE may transmit the S-SSB 305 bursts to each of the intended receiving UEs (e.g., the second, third, and/or fourth UEs) enabling initial and/or continued synchronization of the radio link(s). By transmitting the S-SSB 305 bursts corresponding to a QCL order of 5, 4, 3 in contiguous slots, the first sidelink UE may maintain access to the channel without performing another LBT. In some aspects, the first sidelink UE may indicate the changed (e.g., updated) QCL order of the S-SSB 305 bursts to the second sidelink UE (and other sidelink UEs) in the same slot as the S-SSB 305 bursts. In this regard, the first sidelink UE may transmit the configuration indicating the updated QCL order of the S-SSB 305 bursts to the second sidelink UE via SCI (e.g., SCI-1 and/or SCI-2) in symbols having lower indexes than the symbols in which the S-SSB 305 bursts are transmitted. For example, the first sidelink UE may transmit the configuration indicating the updated QCL order of the S-SSB bursts in symbol indexes 1, 2, or 3 while transmitting the S-SSB bursts in symbols having higher indexes (e.g., any of symbol indexes 4-13).

In some aspects, the configuration may further indicate a discovery reference signal (DRS) window 404 and/or a DRS period 402. The first sidelink UE may transmit SSBs 305 in the form of SSB 305 bursts in S-SSB candidate resources 410(0) . . . 410(5), where an SSB 305 burst may include a set of SSBs 305. The first sidelink UE may repeat the transmission of the SSB 305 burst according to the DRS period 402. The DRS period 402 may represent a periodicity at which the S-SSB 305 burst transmissions are repeated. The DRS period 402 may be any suitable time period. For example, the DRS period 402 may be 5 ms, 10 ms, 20 ms, 40 ms, 80 ms, or 160 ms.

During the DRS window 404, the second sidelink UE may monitor the S-SSB candidate resources 410(0) . . . 410(5) and decode the SSBs 305. The SSBs 305 may include PSS, the SSS, and/or the PBCH. In some instances, the DRS window 404 may be used to indicate the S-SSB candidate resources 410(0) . . . 410(5) the second sidelink UE should monitor for the S-SSB 305 burst. The DRS window 404 may be configured as a time duration starting from the beginning of the DRS period 402 and/or starting at an offset from the beginning of the DRS period 402. For example, the DRS window 404 may be configured as 1 ms, 2 ms, 3 ms, 4 ms, 5 ms, or more.

Figure 5:
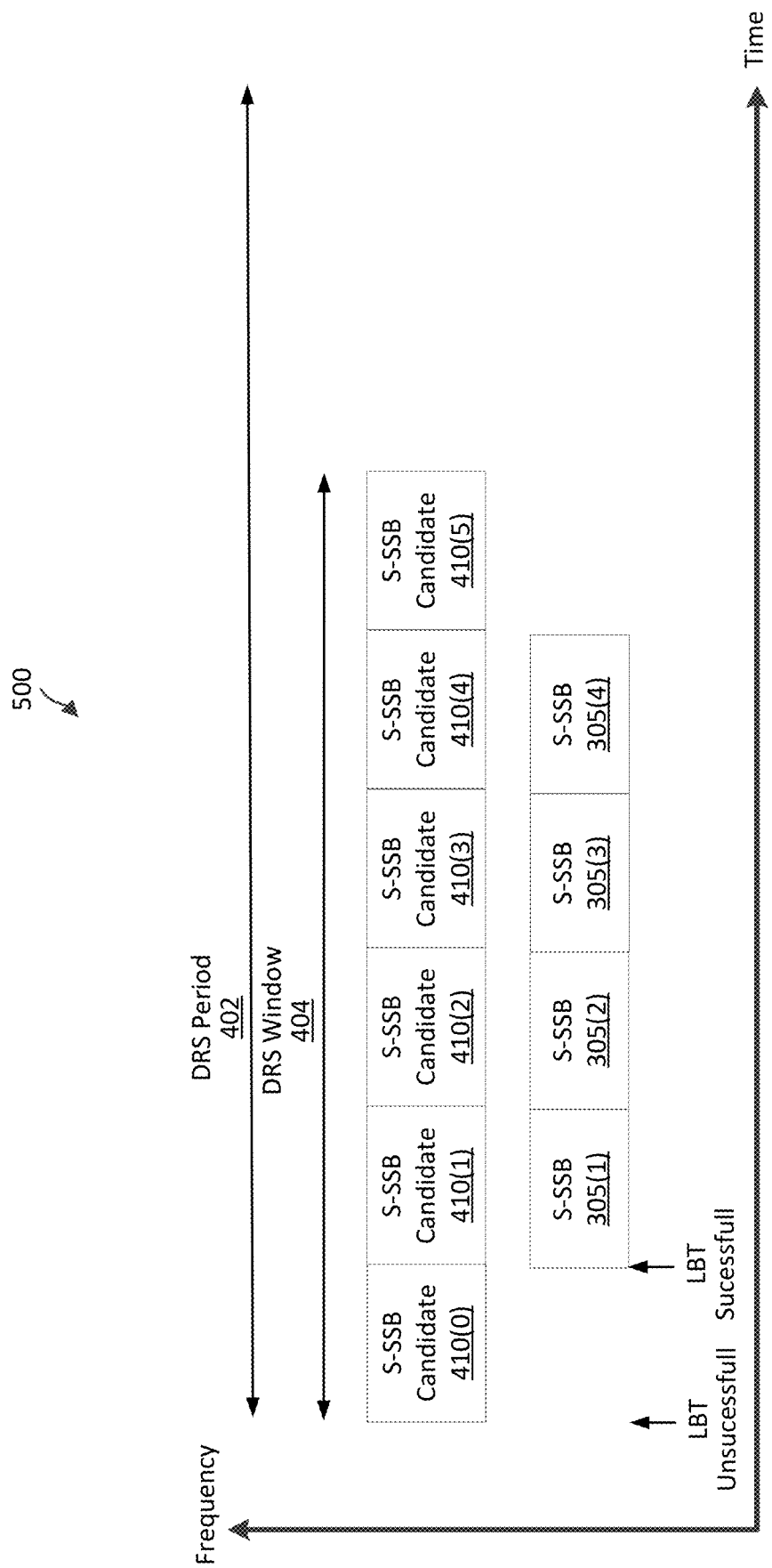
FIG. 5 illustrates an example of a resource configuration that supports contiguous S-SSB bursts according to some aspects of the present disclosure.

FIG. 5 illustrates an example of a resource configuration 500 that supports contiguous sidelink synchronization signal block (S-SSB) 305 bursts according to some aspects of the present disclosure. In FIG. 5, the x-axis represents time in some arbitrary units. The x-axis represents frequency in some arbitrary units. In some aspects, a first sidelink UE (e.g., the UE 115, the UE 120, or the UE 900) may transmit a configuration to a second sidelink UE (e.g., the UE 115, the UE 120, or the UE 900). The configuration may indicate at least one of a length associated with a S-SSB burst, a quasi-colocation (QCL) index associated with the S-SSB 305 burst, a first QCL order associated with the S-SSB 305 burst, and resources associated with transmission of S-SSB bursts 305.

In some aspects, the first sidelink UE may transmit S-SSB bursts across a range of beam directions. The first sidelink UE may sweep the beams in multiple directions in order to establish an initial radio link with the second sidelink UE and other sidelink UEs. Once a beam pair is determined between the first and second sidelink UEs, a smaller set of beams from the transmitter can be swept over a reduced angular region to maintain the radio link. For example, the first sidelink UE may be configured with four beams. The first sidelink UE may transmit S-SSB 305(1) to S-SSB(4) corresponding to the four beams for initial radio link establishment and synchronization between the first sidelink UE and the second sidelink UE. During the DRS window 404, the second sidelink UE may monitor the S-SSB candidate resources 410(0) . . . 410(5) and decode the SSBs 305 for initial radio link establishment. The SSBs 305 may include PSS, the SSS, and/or the PBCH. In some instances, the DRS window 404 may be used to indicate the S-SSB candidate resources 410(0) . . . 410(5) the second sidelink UE should monitor for the S-SSB 305 burst.

In some aspects, the first sidelink UE may perform an LBT or other clear channel assessment (CCA) prior to transmitting an S-SSB 305 burst. As shown in FIG. 5, if the first sidelink UE performs an LBT before attempting to transmit the initial S-SSB 305 beam sweep, the LBT may fail. The failure of the LBT may prevent the first sidelink UE from accessing the channel and transmitting the initial S-SSB 305 beam sweep to the second sidelink UE. The first sidelink UE may wait a period of time (e.g., a backoff time period) and perform another LBT before attempting to transmit the initial S-SSB 305 beam sweep. If the next LBT is successful, then the first sidelink UE may proceed with transmitting the initial S-SSB 305 beam sweep.

In some aspects, the first sidelink UE may transmit the initial S-SSB 305 beam sweep based on a multiple of the DRS period 402. The first sidelink UE may conserve resources (e.g., power resources and/or computing resources) by transmitting the initial S-SSB 305 beam sweep based on a multiple (e.g., an integer multiple greater than 1) of the DRS period 402 as compared to transmitting the initial S-SSB 305 beam sweep based on the DRS period 402.

In some aspects, the first sidelink UE may transmit S-SBB 305 burst(s) to establish an initial radio link with the second sidelink UE and other sidelink UEs. For example, during initial radio link establishment the first sidelink UE may transmit S-SSB 305 bursts on all and/or a subset of the beams the first sidelink UE is configured to transmit on at a multiple of the DRS period 402. After establishing the radio link, the first sidelink UE may transmit S-SSB 305 bursts on beams that have established links to other sidelink UEs in order to maintain the radio links. In some aspects, the second sidelink UE or other sidelink UEs may detect a degradation of the radio link with the first sidelink UE and transmit a request to the first sidelink UE for a more frequent transmission of the S-SSB 305 bursts (e.g., a lower multiple of the DRS period 402). The second sidelink UE may transmit the request to the first sidelink UE for more frequent S-SSB 305 burst transmissions via SCI (e.g., SCI-1 and/or SCI-2) or other suitable communication.

Figure 6:
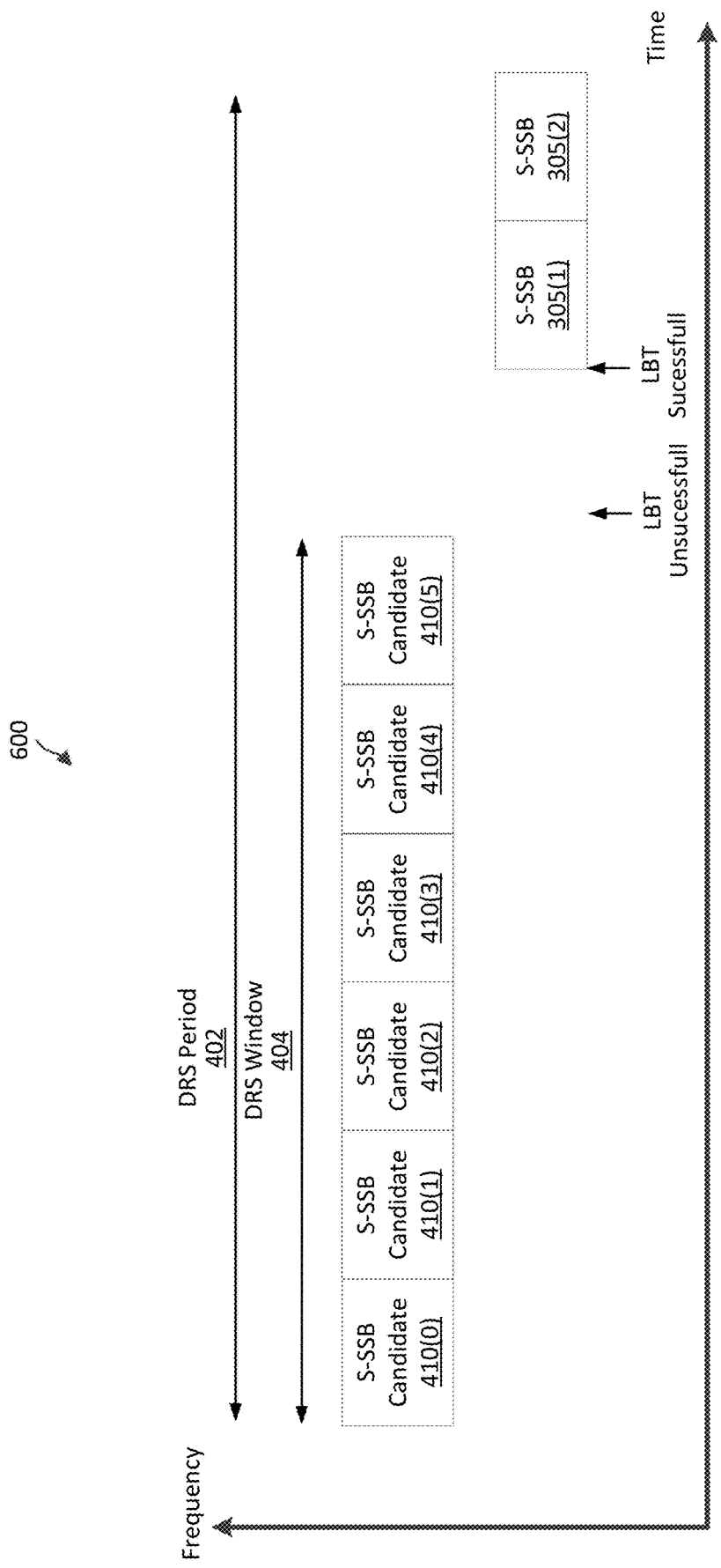
FIG. 6 illustrates an example of a resource configuration that supports opportunistic S-SSB bursts according to some aspects of the present disclosure.

FIG. 6 illustrates an example of a resource configuration 600 that supports asynchronous sidelink synchronization signal block (S-SSB) 305 bursts according to some aspects of the present disclosure. In FIG. 6, the x-axis represents time in some arbitrary units. The x-axis represents frequency in some arbitrary units. In some aspects, a first sidelink UE (e.g., the UE 115, the UE 120, or the UE 900) may transmit a configuration to a second sidelink UE (e.g., the UE 115, the UE 120, or the UE 900).

In some aspects, the first sidelink UE may transmit an additional S-SSB burst to the second sidelink UE outside of the DRS window 404 based on a radio link quality between the first sidelink UE and the second sidelink UE. In some aspects, the second UE may monitor the radio link quality between the first UE and the second UE. For example, the second UE may measure the link quality (e.g., an RSRP associated with the S-SSB 305 burst, a signal to interference plus noise ratio (SINR) associated with the S-SSB 305 burst, or other suitable link quality measurements) and compare the link quality with a threshold value. If the link quality is below, equal to or below, and/or approaching the threshold value (e.g., trending toward the threshold value over a time period), then the second sidelink UE may transmit a request to the first sidelink UE for an additional S-SSB 305 burst. In response to the request, the first sidelink UE may asynchronously transmit one or more additional S-SSB bursts outside of the DRS window 404. For example, as shown in FIG. 6, the first sidelink UE may transmit S-SSB 305(1) and S-SSB 305(2) to the second sidelink UE outside the DRS window 404. The first sidelink UE may asynchronously transmit S-SSB 305(1) and S-SSB 305(2) to the second sidelink UE based on a successful LBT. In some aspects, the first sidelink UE may detect a degradation in the link quality between the first sidelink UE and the second sidelink UE. For example, the first sidelink UE may receive negative acknowledgments (NACKs) from the second sidelink UE at a rate greater than or equal to a threshold. The rate of receiving NACKs (e.g., number of NACKs received over a time period) may indicate a radio link quality degradation. In response to the radio link degradation, the first sidelink UE may asynchronously transmit one or more additional S-SSB bursts (e.g., S-SSB 305(1) and/or S-SSB(2)) to the second sidelink UE outside of the DRS window 404.

The first sidelink UE may transmit S-SBB burst(s) to establish an initial radio link with the second sidelink UE and other sidelink UEs. For example, during initial radio link establishment the first sidelink UE may transmit S-SSB bursts on all and/or a subset of the beams the first sidelink UE is configured to transmit on at a multiple of the DRS period. After establishing the radio link, the first sidelink UE may transmit S-SSB bursts on beams that have established links to other sidelink UEs in order to maintain the radio links. In some aspects, the second sidelink UE or other sidelink UEs may detect a degradation of the radio link with the first sidelink UE and transmit a request to the first sidelink UE for a more frequent transmission of the S-SSB bursts (e.g., a lower multiple of the DRS period). The second sidelink UE may transmit the request to the first sidelink UE for more frequent S-SSB burst transmissions via SCI (e.g., SCI-1 and/or SCI-2) or other suitable communication.

Figure 7:
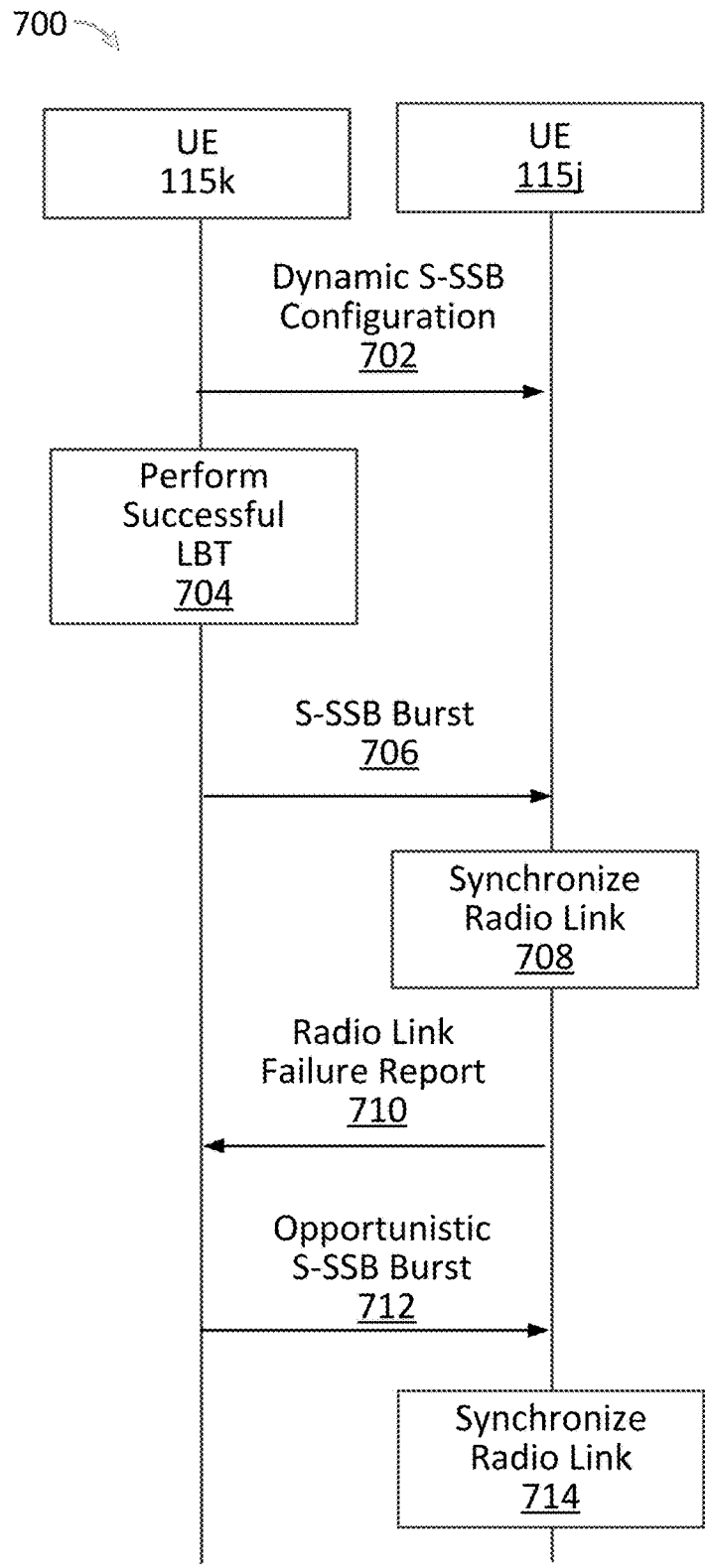
FIG. 7 is a signaling diagram of a wireless communication method according to some aspects of the present disclosure.

FIG. 7 is a signaling diagram of a wireless communication method 700 according to some aspects of the present disclosure. Actions of the communication method 700 can be executed by a computing device (e.g., a processor, processing circuit, and/or other suitable component) of a communication device or other suitable means for performing the actions. For example, a wireless communication device, such as the UE 115, UE 120, or UE 900, may utilize one or more components, such as the processor 902, the memory 904, the dynamic S-SSB module 908, the transceiver 910, the modem 912, and the one or more antennas 916, to execute aspects of method 700.

At action 702, the UE 115*k* (e.g., a first sidelink UE) may transmit a dynamic S-SSB configuration to the UE 115*j* (e.g., a second sidelink UE). The configuration may indicate at least one of a length associated with a S-SSB burst, a quasi-colocation (QCL) index associated with the S-SSB burst, and/or a first QCL order associated with the S-SSB burst. In this regard, the UE 115*k* may transmit the configuration to the UE 115*j* via a PC5 communication, sidelink control information (e.g., SCI-1, SCI-2), a radio resource control (RRC) communication, or other suitable communication. Additionally or alternatively, the UE 115*k* may receive the configuration from a network unit (e.g., the BS 105, the CU 1210, the DU 1230, the RU 1240, and/or the network unit 1000) via downlink control information (DCI), a radio resource control (RRC) communication, or other suitable communication. The UE 115*k* may transmit (e.g., forward) the configuration received from the network unit to the UE 115*j*.

At action 704, the UE 115*k* may perform a successful LBT. In this regard, the first sidelink UE may perform a LBT procedure to gain access to the channel in unlicensed frequency spectrum. For example, the first sidelink UE may perform a category 2 LBT, a category 3, LBT and/or a category 4 LBT to gain access to the channel in the unlicensed frequency spectrum.

At action 706, the UE 115*k* may transmit an S-SSB burst to the UE 115*j*. The UE 115*k* may transmit the S-SSB burst to the UE 115*j* based on performing a successful LBT at action 704. If the LBT is successful, then the UE 115*k* may transmit the S-SSB burst(s) to the UE 115*j* and other UEs in a number of contiguous slots indicated by the length associated with the S-SSB burst. The order of the S-SSB burst transmissions may be based on the first QCL order indicated by the UE 115*k* in the configuration at action 702. If the LBT is unsuccessful, then the UE 115*k* may wait a period of time (e.g., backoff time period) to perform another LBT. For example, the UE 115*k* may wait until an offset from the next slot boundary to perform another LBT. If the subsequent LBT is successful, then the UE 115*k* may transmit an additional configuration indicating a second QCL order for the S-SSB burst. The second QCL order may be different from the first QCL order. For example, the UE 115*k* may transmit an initial configuration at action 702 indicating the first QCL order (e.g., 3, 5, 4). The first QCL order may be based on a first LBT being successful. The UE 115*k* may transmit an updated configuration indicating the second QCL order (e.g., 5, 4, 3) based on the first LBT being unsuccessful and a second LBT being successful. In some aspects, if the first and second LBTs are unsuccessful, then the UE 115*k* may transmit an updated configuration indicating a third CQL order (e.g., 4, 3, 5) based on a third LBT being successful.

At action 708, the UE 115*j* may receive the S-SSB burst(s) from the UE 115*k* and derive carrier frequency and slot timing from the S-SSB burst(s).

At action 710, the UE 115*j* may transmit a radio link failure report to the UE 115*k*. The UE 115*j* may determine a radio link failure by evaluating the S-SSB burst and/or other reference signals over a time period against thresholds (e.g., Qout and/or Qin) configured by rlmInSyncOutOfSyncThreshold. For example, the UE 115*k* may measure the link quality (e.g., an RSRP associated with the S-SSB burst, a signal to interference plus noise ratio (SINR) associated with the S-SSB burst, or other suitable link quality measurements) and compare the link quality with a threshold value (e.g., Qin and/or Qout). If the link quality is below, equal to or below, and/or approaching the threshold value (e.g., trending toward the threshold value over a time period), then the UE 115*k* may transmit the radio link failure report (e.g., a CSI-RS report) and a request to the first sidelink UE for an additional (e.g., opportunistic) S-SSB burst.

At action 712, the UE 115k may transmit an opportunistic S-SSB burst to the UE 115k in response to receiving the radio link failure report at action 710. The UE 115k may asynchronously transmit the opportunistic S-SSB burst to the UE 115k outside of the DRS window.

At action 714, the UE 115j may receive the asynchronous S-SSB burst(s) from the UE 115k at action 712 and derive carrier frequency and slot timing from the S-SSB burst(s) to synchronize the radio link with the UE 115k.

Figure 8:
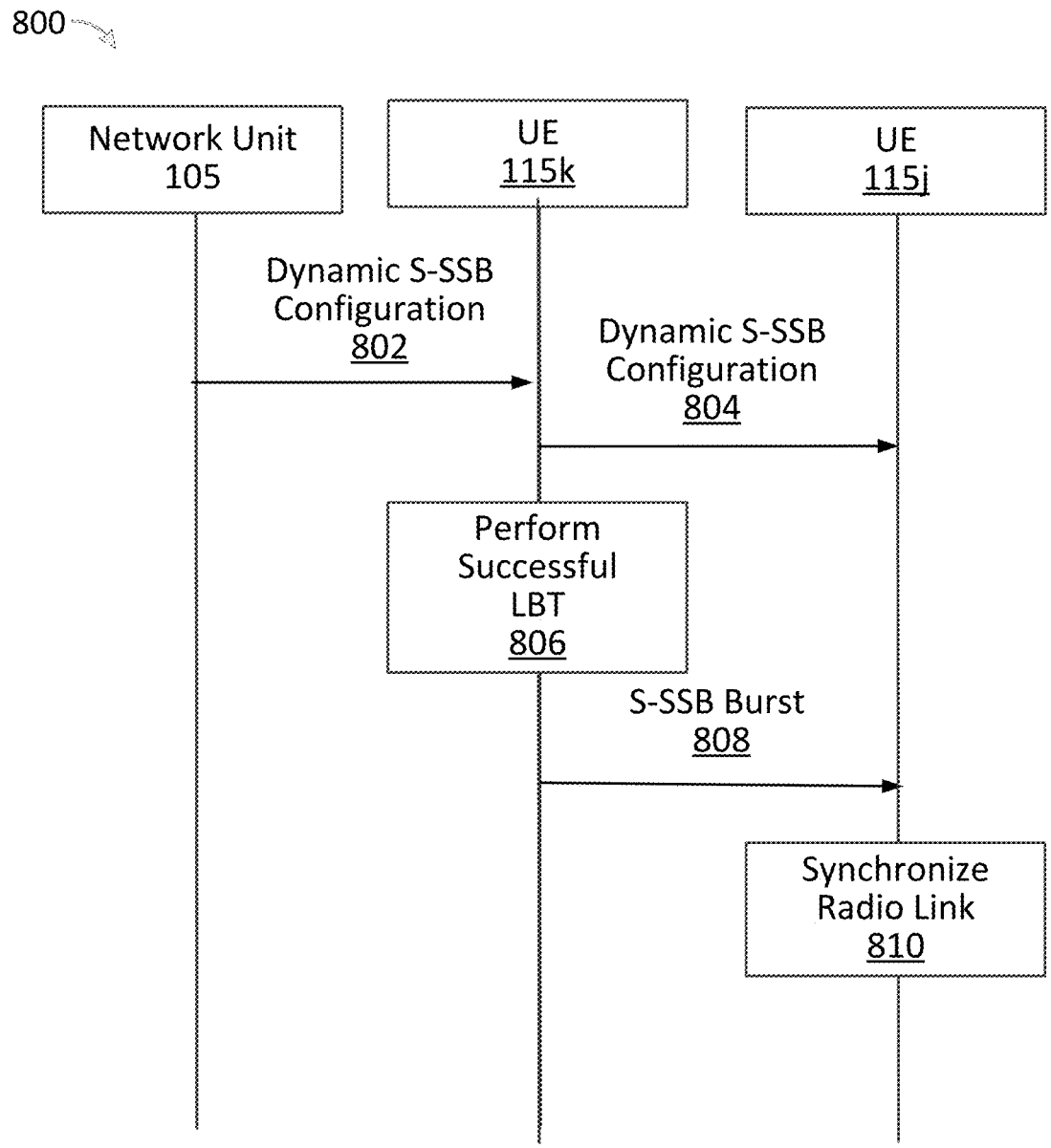
FIG. 8 is a signaling diagram of a wireless communication method according to some aspects of the present disclosure.

FIG. 8 is a signaling diagram of a wireless communication method 800 according to some aspects of the present disclosure. Actions of the communication method 800 can be executed by a computing device (e.g., a processor, processing circuit, and/or other suitable component) of a communication device or other suitable means for performing the actions. For example, a wireless communication device, such as the UE 115, UE 120, or UE 900, may utilize one or more components, such as the processor 902, the memory 904, the dynamic S-SSB module 908, the transceiver 910, the modem 912, and the one or more antennas 916, to execute aspects of method 800. A wireless communication device, such as the BS 105, the CU 1210, the DU 1230, the RU 1240, and/or the network unit 1000 may utilize one or more components, such as the processor 1002, the memory 1004, the dynamic S-SSB module 1008, the transceiver 1010, the modem 1012, and the one or more antennas 1016, to execute aspects of method 800.

At action 802, the network unit 105 may transmit a dynamic S-SSB configuration to the UE 115k (e.g., a first sidelink UE). The configuration may indicate at least one of a length associated with a S-SSB burst, a quasi-colocation (QCL) index associated with the S-SSB burst, and/or a first QCL order associated with the S-SSB burst. In this regard, the network unit 105 may transmit the configuration to the UE 115k via a Uu communication, downlink control information (DCI), a radio resource control (RRC) communication, or other suitable communication.

At action 804, the UE 115k may receive the configuration from the network unit 105. The UE 115k may transmit (e.g., forward) the dynamic S-SSB configuration received from the network unit to the UE 115j.

At action 806, the UE 115k may perform a successful LBT. In this regard, the first sidelink UE may perform a LBT procedure to gain access to the channel in unlicensed frequency spectrum. For example, the first sidelink UE may perform a category 2 LBT, a category 3, LBT and/or a category 4 LBT to gain access to the channel in the unlicensed frequency spectrum.

At action 808, the UE 115k may transmit an S-SSB burst to the UE 115j. The UE 115k may transmit the S-SSB burst to the UE 115j based on performing a successful LBT at action 804. If the LBT is successful, then the UE 115k may transmit the S-SSB burst(s) in a number of contiguous slots indicated by the length associated with the S-SSB burst. The order of the S-SSB burst transmissions may be based on the first QCL order indicated by the UE 115k in the configuration at action 802. If the LBT is unsuccessful, then the UE 115k may wait a period of time (e.g., backoff time period) to perform another LBT. For example, the UE 115k may wait until an offset from the next slot boundary to perform another LBT. If the subsequent LBT is successful, then the UE 115k may transmit an additional configuration indicating a second QCL order for the S-SSB burst. The second QCL order may be different from the first QCL order. For example, the UE 115k may transmit an initial configuration at action 804 indicating the first QCL order (e.g., 3, 5, 4). The first QCL order may be based on a first LBT being successful. The UE 115k may transmit an updated configuration indicating the second QCL order (e.g., 5, 4, 3) based on the first LBT being unsuccessful and a second LBT being successful. In some aspects, if the first and second LBTs are unsuccessful, then the UE 115k may transmit an updated configuration indicating a third CQL order (e.g., 4, 3, 5) based on a third LBT being successful.

At action 810, the UE 115j may receive the S-SSB burst(s) from the UE 115k and derive carrier frequency and slot timing from the S-SSB burst(s).

Figure 9:
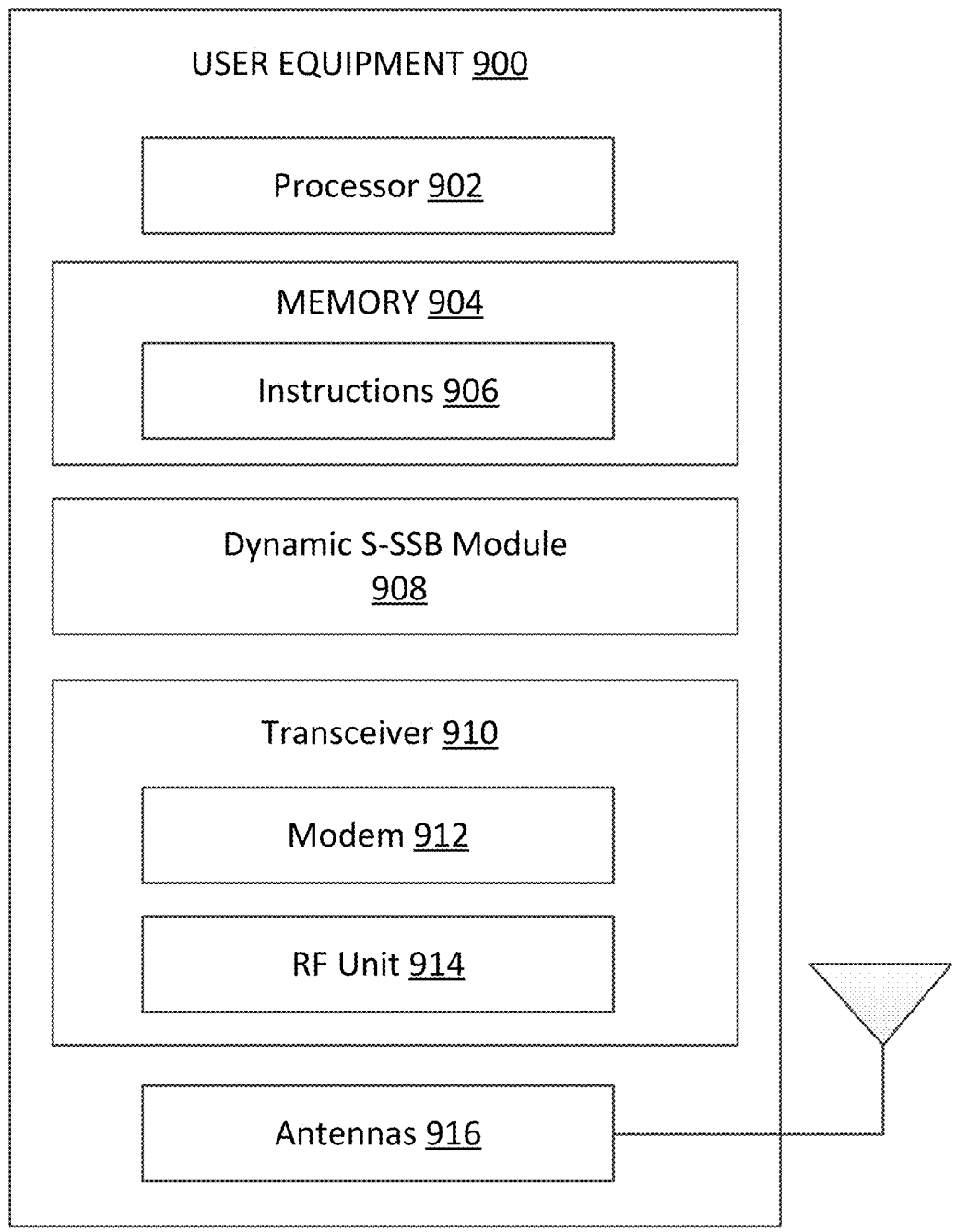
FIG. 9 is a block diagram of an exemplary user equipment (UE) according to some aspects of the present disclosure.

FIG. 9 is a block diagram of an exemplary UE 900 according to some aspects of the present disclosure. The UE 900 may be the UE 115 or the UE 120 in the network 100 or 1200 as discussed above. As shown, the UE 900 may include a processor 902, a memory 904, a dynamic S-SSB module 908, a transceiver 910 including a modem subsystem 912 and a radio frequency (RF) unit 914, and one or more antennas 916. These elements may be coupled with each other and in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with aspects of the present disclosure, for example, aspects of FIGS. 3-8. Instructions 906 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The dynamic S-SSB module 908 may be implemented via hardware, software, or combinations thereof. For example, the dynamic S-SSB module 908 may be implemented as a processor, circuit, and/or instructions 906 stored in the memory 904 and executed by the processor 902. In some aspects, the dynamic S-SSB module 908 may be used to transmit, to a second sidelink UE (e.g., the UE 115 or the UE 120), a configuration indicating at least one of a length associated with a sidelink synchronization signal block (S-SSB) burst, a quasi-colocation (QCL) index associated with the S-SSB burst, or a first QCL order associated with the S-SSB burst. In some aspects, the dynamic S-SSB module 908 may be used to transmit, to the second sidelink UE, the S-SSB burst based on the at least one of the length associated with the S-SSB burst, the QCL index associated with the S-SSB burst, or the first QCL order associated with the S-SSB burst.

As shown, the transceiver 910 may include the modem subsystem 912 and the RF unit 914. The transceiver 910 can be configured to communicate bi-directionally with other devices, such as the BSs 105 and/or the UEs 115. The modem subsystem 912 may be configured to modulate and/or encode the data from the memory 904 and the according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

In some instances, the UE 900 can include multiple transceivers 910 implementing different RATs (e.g., NR and LTE). In some instances, the UE 900 can include a single transceiver 910 implementing multiple RATs (e.g., NR and LTE). In some instances, the transceiver 910 can include various components, where different combinations of components can implement RATs.

Figure 10:
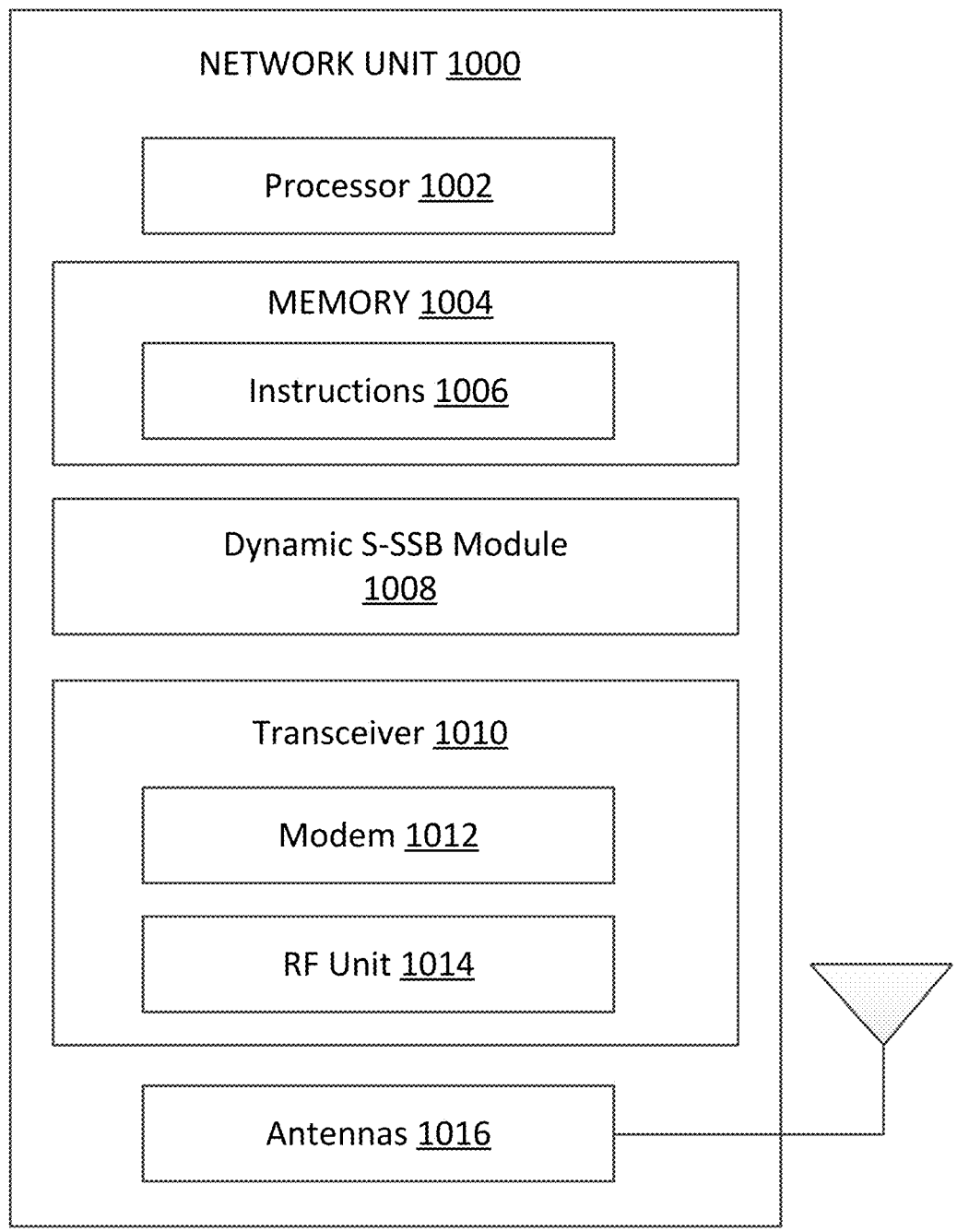
FIG. 10 is a block diagram of an exemplary network unit according to some aspects of the present disclosure.

FIG. 10 is a block diagram of an exemplary network unit 1000 according to some aspects of the present disclosure. The network unit 1000 may be a BS 105, the CU 1210, the DU 1230, or the RU 1240, as discussed above. As shown, the network unit 1000 may include a processor 1002, a memory 1004, a dynamic S-SSB module 1008, a transceiver 1010 including a modem subsystem 1012 and a RF unit 1014, and one or more antennas 1016. These elements may be coupled with each other and in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 3-8. Instructions 1006 may also be referred to as code, which may be interpreted broadly to include any type of computer-readable statement(s).

The dynamic S-SSB module 1008 may be implemented via hardware, software, or combinations thereof. For example, the dynamic S-SSB module 1008 may be implemented as a processor, circuit, and/or instructions 1006 stored in the memory 1004 and executed by the processor 1002.

In some aspects, the dynamic S-SSB module 1008 may implement the aspects of FIGS. 3-8. For example, the dynamic S-SSB module 1008 may transmit, to a sidelink UE (e.g., UE 115, UE 120, or UE 900), a configuration indicating at least one of a length associated with a sidelink synchronization signal block (S-SSB) burst, a quasi-colocation (QCL) index associated with the S-SSB burst, or a first QCL order associated with the S-SSB burst.

Additionally or alternatively, the dynamic S-SSB module 1008 can be implemented in any combination of hardware and software, and may, in some implementations, involve, for example, processor 1002, memory 1004, instructions 1006, transceiver 1010, and/or modem 1012.

As shown, the transceiver 1010 may include the modem subsystem 1012 and the RF unit 1014. The transceiver 1010 can be configured to communicate bi-directionally with other devices, such as the UEs 115 and/or 600. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or UE 900. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the network unit 1000 to enable the network unit 1000 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, a configuration indicating a plurality of sub-slots within a slot according to aspects of the present disclosure. The antennas 1016 may further receive data messages transmitted from other devices and provide the received data messages for processing and/or demodulation at the transceiver 1010. The antennas 1016 may include multiple antennas of similar or different designs in order to sustain multiple transmission links.

In some instances, the network unit 1000 can include multiple transceivers 1010 implementing different RATs (e.g., NR and LTE). In some instances, the network unit 1000 can include a single transceiver 1010 implementing multiple RATs (e.g., NR and LTE). In some instances, the transceiver 1010 can include various components, where different combinations of components can implement RATs.

Figure 11:
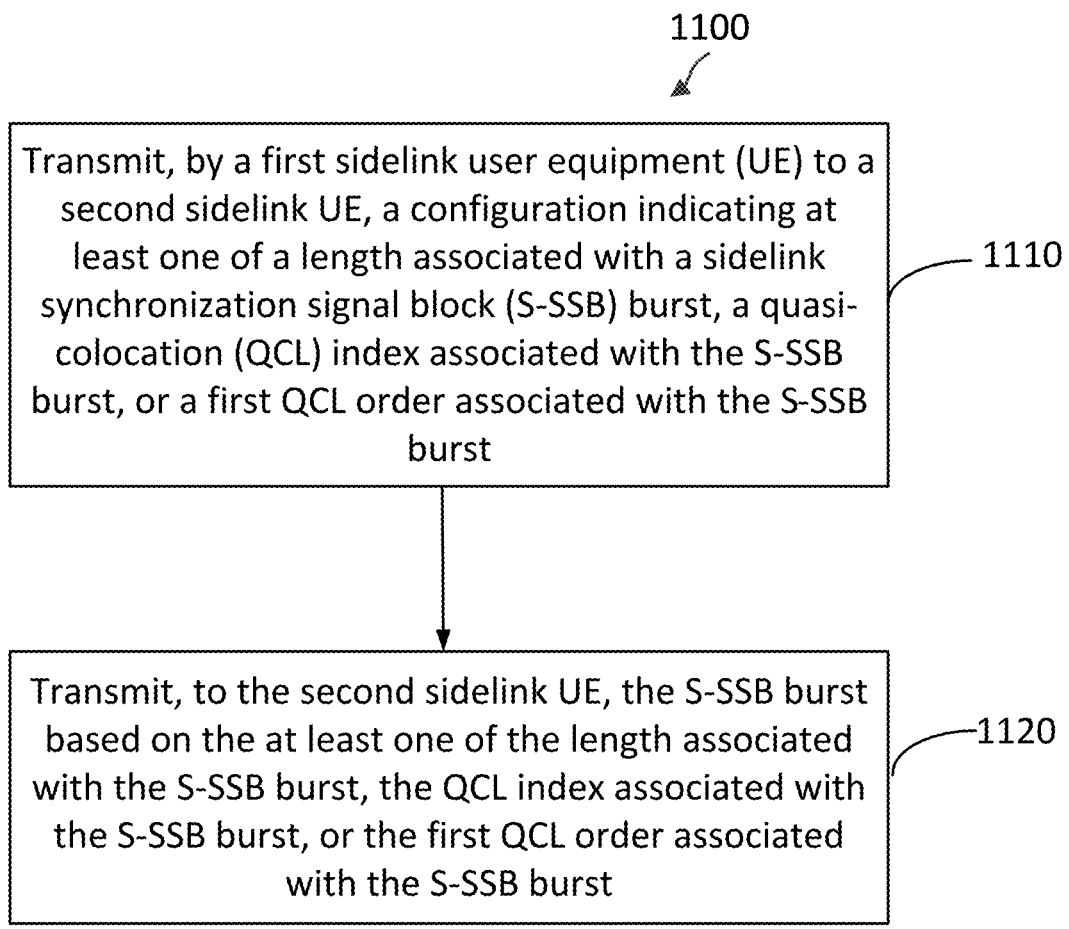
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the dynamic S-SSB module 908, the transceiver 910, the modem 912, and the one or more antennas 916, to execute aspects of method 1100. The method 1100 may employ similar mechanisms as in the networks 100 and 1200 and the aspects and actions described with respect to FIGS. 3-8. As illustrated, the method 1100 includes a number of enumerated aspects, but the method 1100 may include additional aspects before, after, and in between the enumerated aspects. In some aspects, one or more of the enumerated aspects may be omitted or performed in a different order.

At action 1110, the method 1100 includes a first sidelink UE (e.g., the UE 115, the UE 120, or the UE 900) transmitting a configuration to a second sidelink UE. The configuration may indicate at least one of a length associated with a sidelink synchronization signal block (S-SSB) burst, a quasi-colocation (QCL) index associated with the S-SSB burst, and/or a first QCL order associated with the S-SSB burst. In this regard, the first sidelink UE may transmit the configuration to the second sidelink UE via a PC5 communication, sidelink control information (e.g., SCI-1, SCI-2), a radio resource control (RRC) communication, or other suitable communication. Additionally or alternatively, the first sidelink UE may receive the configuration from a network unit (e.g., the BS 105, the CU 1210, the DU 1230, the RU 1240, and/or the network unit 1000) via downlink control information (DCI), a radio resource control (RRC) communication, or other suitable communication. The first sidelink UE may transmit (e.g., forward) the configuration received from the network unit to the second sidelink UE.

The configuration may indicate a length associated with the S-SSB burst. In this regard, the length associated with the S-SSB burst may indicate a number of contiguous slots associated with the S-SSB burst. For example, the configuration may indicate a length of 1, 2, 3, 4, 5, or more slots associated with the S-SSB burst. Additionally or alternatively, the configuration may indicate a length of 1, 2, 3, 4, 5, or more sub-slots associated with the S-SSB burst. A slot may be partitioned into multiple sub-slots. Each sub-slot may include a number of symbols (e.g., 1, 2, 3, 4, or more symbols). Additionally or alternatively, the configuration may indicate a length of 1, 2, 3, 4, 5, or more symbols associated with the S-SSB burst. The slots associated with the S-SSB burst may be contiguous in time and have consecutive slot indexes. In some aspects, the length associated with the S-SSB burst may be based on a number of UEs the first sidelink UE is scheduled to transmit the S-SSB burst to.

The first sidelink UE may schedule communications (e.g., transport blocks) to be transmitted to a number of UEs (e.g., 1, 2, 3, 4, 5, or more UEs). The number of UEs may include the second sidelink UE. For example, the first sidelink UE may schedule communications to the second sidelink UE and a third sidelink UE. The first sidelink UE may establish radio links with the second sidelink UE and the third sidelink UE based on transmitting an initial S-SSB burst(s) to the second sidelink UE and the third sidelink UE. The length of the S-SSB burst(s) may include two contiguous slots (e.g., a first slot and a second slot). The first sidelink UE may transmit an S-SSB burst to the second sidelink UE via the first slot and transmit an S-SSB burst to the third sidelink UE via the second slot (e.g., contiguous to the first slot) to establish radio links. By setting the length associated with the S-SSB burst(s) based on the number of UEs the first sidelink UE is scheduled to communicate with, the first sidelink UE may conserve resources (e.g., power resources, computing resources) as compared to transmitting S-SSB bursts to UEs the first sidelink UE is not scheduled to communicate with. Further, by setting the length associated with the S-SSB burst based on the number of UEs the first sidelink UE is scheduled to communicate with, the first sidelink UE may reduce potential radio interference in the wireless network (e.g., wireless networks 100 or 1200). Although the example above describes transmitting an S-SSB burst to the second sidelink UE and/or the third sidelink UE in a single slot, the present disclosure is not so limited and the first sidelink UE may transmit any number of S-SSB bursts via any number of slots to the second sidelink UE and/or to the third sidelink UE.

The configuration may indicate a QCL index associated with the S-SSB burst. In some aspects, the QCL index associated with the S-SSB burst may indicate a beam associated with the S-SSB burst. In this regard, the first sidelink UE may transmit the S-SSB burst via a beam in the direction of the second sidelink UE. The first sidelink UE may be configured to transmit S-SSB bursts via multiple directional beams (e.g., 1, 2, 4, 8, or more directional beams). The QCL index may correspond to the directional beam. For example, when the first sidelink UE is configured to transmit in 8 directional beams, the QCL index may have a value between 0 and 7. The QCL index may correspond to the directional beam that provides the highest radio link quality (e.g., highest reference signal received power (RSRP)) at the second sidelink UE. The second sidelink UE may measure one or more suitable beam parameters that may be reported to the first sidelink UE. The second sidelink UE may transmit a channel state information (CSI) report associated with the directional beam that provides the highest radio link quality to the first sidelink UE. The CSI report may indicate which beamformed S-SSB burst(s) have resulted in the highest received power based on the measurements. The second sidelink UE may receive the S-SSB burst(s), and derive carrier frequency and slot timing from the S-SSB burst(s). By transmitting the S-SSB to the second sidelink UE via the directional beam that provides the highest link quality, the first sidelink UE may increase the probability of establishing and/or maintaining the radio link between the first and second sidelink UEs as compared to transmitting the S-SSB to the second sidelink UE via a directional beam that provides lower link quality.

In some aspects, the first sidelink UE may indicate the QCL index of the S-SSB burst to the second sidelink UE (and other sidelink UEs) in the same slot as the S-SSB burst. In this regard, the first sidelink UE may transmit the configuration indicating the QCL index of the S-SSB burst to the second sidelink UE via SCI (e.g., SCI-1 and/or SCI-2) in symbols having lower indexes than the symbols in which the S-SSB burst is transmitted. For example, the first sidelink UE may transmit the configuration indicating the QCL index of the S-SSB burst in symbol indexes 1, 2, or 3 while transmitting the S-SSB burst in symbols having higher indexes (e.g., any of symbol indexes 4-13).

In some aspects, the first sidelink UE may transmit the configuration comprising the QCL index associated with the S-SSB burst as a codepoint via a physical sidelink broadcast channel (PSBCH). For example, the first sidelink UE may transmit the configuration comprising the QCL index as a codepoint via a PSBCH demodulation reference signal (DMRS) scrambling sequence. The codepoint be a binary number (e.g., 1, 2, 3, 4, or more bits) representing the QCL index. Additionally or alternatively, the first sidelink UE may transmit the configuration comprising the QCL index as a codepoint via a PSBCH payload.

In some aspects, all bits of the codepoint may be carried by the PSBCH DMRS scrambling sequence. Additionally or alternatively, all bits of the codepoint may be carried by the PSBCH payload. In some aspects, some bits of the codepoint be carried by the PSBCH DMRS scrambling sequence while the remaining bits may be carried by the PSBCH payload. For example, the least significant bit(s) of the codepoint may be carried by the PSBCH DMRS scrambling sequence while the most significant bit(s) may be carried by the PSBCH payload. The configuration may indicate a QCL order associated with the S-SSB burst. In some aspects, the QCL order associated with the S-SSB burst may indicate an ordered sequence of beam indexes associated with the S-SSB burst. The QCL order may indicate the beam index for each of the contiguous slots carrying the S-SSB burst(s). For example, the first sidelink UE may transmit an S-SSB burst to the second sidelink UE using beam index 2 in a slot. The first sidelink UE may subsequently transmit an S-SSB burst to the third sidelink UE in a contiguous slot using beam index 0. The first sidelink UE may subsequently transmit S-SSB burst to a fourth sidelink UE in the next contiguous slot using beam index 1. In this case, the QCL order will be 0, 2, 1. As another example, the first sidelink UE may transmit an S-SSB burst to the second sidelink UE using beam index 3. The first sidelink UE may subsequently transmit an S-SSB burst to the third sidelink UE using beam index 5 and then transmit an S-SSB burst to a fourth sidelink UE using beam index 4. In this case, the QCL order will be 3, 5, 4.

In some instances, the first sidelink UE may perform an LBT or other clear channel assessment (CCA) prior to transmitting an S-SSB burst. For example, if the first sidelink UE performs an LBT before attempting to transmit the S-SSB burst to the second sidelink UE using beam index 3, the LBT may fail. The failure of the LBT may prevent the first sidelink UE from accessing the channel and transmitting the S-SSB to the second sidelink UE. The first sidelink UE may perform another LBT before attempting to transmit the S-SSB burst to the third sidelink UE using beam index 5. If the LBT is successful, then the first sidelink UE may proceed with transmitting the S-SSB burst to the third sidelink UE using beam index 5, then transmit another S-SSB burst to the fourth sidelink UE using beam index 4, and then transmit another S-SSB burst to the second sidelink UE using beam index 3. In this manner, the UE may dynamically change the order of the S-SSB bursts based on whether the LBT is successful or unsuccessful. By dynamically changing the order of the S-SSB bursts to 5, 4, 3 from 3, 5, 4, the first sidelink UE may transmit the S-SSB bursts to each of the intended receiving UEs (e.g., the second, third, and/or fourth UEs) enabling initial and/or continued synchronization of the radio link(s). By transmitting the S-SSB bursts corresponding to a QCL order of 5, 4, 3 in contiguous slots, the first sidelink UE may maintain access to the channel without performing another LBT. In some aspects, the first sidelink UE may indicate the changed (e.g., updated) QCL order of the S-SSB bursts to the second sidelink UE (and other sidelink UEs) in the same slot as the S-SSB bursts. In this regard, the first sidelink UE may transmit the configuration indicating the updated QCL order of the S-SSB bursts to the second sidelink UE via SCI (e.g., SCI-1 and/or SCI-2) in symbols having lower indexes than the symbols in which the S-SSB bursts are transmitted. For example, the first sidelink UE may transmit the configuration indicating the updated QCL order of the S-SSB bursts in symbol indexes 1, 2, or 3 while transmitting the S-SSB bursts in symbols having higher indexes (e.g., any of symbol indexes 4-13).

In some aspects, the first sidelink UE may transmit the configuration comprising the QCL order associated with the S-SSB burst as a codepoint via a physical sidelink broadcast channel (PSBCH). For example, the first sidelink UE may transmit the configuration comprising the QCL order as a codepoint via a PSBCH demodulation reference signal (DMRS) scrambling sequence. The codepoint be a binary number (e.g., 1, 2, 3, 4, or more bits) representing the QCL order. Additionally or alternatively, the first sidelink UE may transmit the configuration comprising the QCL order as a codepoint via a PSBCH payload.

In some aspects, all bits of the QCL order codepoint may be carried by the PSBCH DMRS scrambling sequence. Additionally or alternatively, all bits of the QCL order codepoint may be carried by the PSBCH payload. In some aspects, some bits of the QCL order codepoint be carried by the PSBCH DMRS scrambling sequence while the remaining bits may be carried by the PSBCH payload. For example, the least significant bit(s) of the codepoint may be carried by the PSBCH DMRS scrambling sequence while the most significant bit(s) may be carried by the PSBCH payload.

In some aspects, the configuration may further indicate a discovery reference signal (DRS) window and a DRS period. The first sidelink UE may transmit SSBs in the form of SSB bursts, where an SSB burst may include a set of SSBs. The first sidelink UE may repeat the transmission of the SSB burst according to the DRS period. The DRS period may represent a periodicity at which the S-SSB burst transmissions are repeated. The DRS period may be any suitable time period. For example, the DRS period may be 5 ms, 10 ms, 20 ms, 40 ms, 80 ms, or 160 ms.

During the DRS window, the second sidelink UE may monitor for and decode the SSBs. The SSBs may include PSS, the SSS, and/or the PBCH. In some instances, the DRS window may be used to indicate when the second sidelink UE should monitor for the S-SSB burst. The DRS window may be configured as a time duration starting from the beginning of the DRS period and/or starting at an offset from the beginning of the DRS period. For example, the DRS window may be configured as 0.5 ms, 1 ms, 2 ms, 3 ms, 4 ms, 5 ms, or more.

In some aspects, the configuration may further indicate a power scaling factor. The power scaling factor may be indicated for each slot in which an S-SBB is transmitted. Since the first sidelink UE may multiplex the S-SSB with a PSSCH transmission in each slot, the total transmit power (e.g., maximum 23 dBm or other suitable limit) may be shared between the S-SSB and the PSSCH. The power scaling factor may indicate to the second sidelink UE how the power is shared between the S-SSB and the PSSCH. The power scaling factor may be based on the size of the PSSCH transmission (e.g., the size of the transport block carried by the PSSCH). The second sidelink UE may use the power scaling factor when monitoring for S-SSB bursts during an initial radio link connection to the first sidelink UE and/or during radio link monitoring to maintain the radio link with the first sidelink UE.

At action 1120, the method 1100 includes the first sidelink UE (e.g., the UE 115, the UE 120, or the UE 900) transmitting the S-SSB burst to the second sidelink UE. The first sidelink UE may transmit the S-SSB burst based on at least one of the length associated with the S-SSB burst, the QCL index associated with the S-SSB burst, and/or the first QCL order associated with the S-SSB burst. The first sidelink UE may transmit the S-SSB burst to the second sidelink UE in an unlicensed frequency spectrum (e.g., a shared frequency spectrum). In this regard, the first sidelink UE may perform a listen-before-talk (LBT) procedure to gain access to the channel in the unlicensed frequency spectrum. For example, the first sidelink UE may perform a category 2 LBT, a category 3, LBT and/or a category 4 LBT to gain access to the channel in the unlicensed frequency spectrum. In some instances, the QCL order may be based on the success and/or failure of one or more LBTs. For example, if an LBT is successful, then the first sidelink UE may transmit the S-SSB burst(s) in a number of contiguous slots indicated by the length associated with the S-SSB burst. The order of the S-SSB burst transmissions may be based on the first QCL order indicated by the first sidelink UE. If the LBT is unsuccessful, then the first sidelink UE may wait a period of time (e.g., backoff time period) to perform another LBT. For example, the first sidelink UE may wait until an offset from the next slot boundary to perform another LBT. If the subsequent LBT is successful, then the first sidelink UE may transmit an additional configuration indicating a second QCL order for the S-SSB burst. The second QCL order may be different from the first QCL order. For example, the first sidelink UE may transmit an initial configuration indicating the first QCL order (e.g., 3, 5, 4). The first QCL order may be based on a first LBT being successful. The first sidelink UE may transmit an updated configuration indicating the second QCL order (e.g., 5, 4, 3) based on the first LBT being unsuccessful and a second LBT being successful. In some aspects, if the first and second LBTs are unsuccessful, then the first sidelink UE may transmit an updated configuration indicating a third CQL order (e.g., 4, 3, 5) based on a third LBT being successful.

In some aspects, the first sidelink UE may transmit the S-SSB burst based on a multiple of the DRS period. The first sidelink UE may conserve resources (e.g., power resources and/or computing resources) by transmitting the S-SSB burst based on a multiple (e.g., an integer multiple greater than 1) of the DRS period as compared to transmitting the S-SSB burst based on the DRS period. The first sidelink UE may transmit S-SBB burst(s) to establish an initial radio link with the second sidelink UE and other sidelink UEs. For example, during initial radio link establishment the first sidelink UE may transmit S-SSB bursts on all and/or a subset of the beams the first sidelink UE is configured to transmit on at a multiple of the DRS period. After establishing the radio link, the first sidelink UE may transmit S-SSB bursts on beams that have established links to other sidelink UEs in order to maintain the radio links. In some aspects, the second sidelink UE or other sidelink UEs may detect a degradation of the radio link with the first sidelink UE and transmit a request to the first sidelink UE for a more frequent transmission of the S-SSB bursts (e.g., a lower multiple of the DRS period). The second sidelink UE may transmit the request to the first sidelink UE for more frequent S-SSB burst transmissions via SCI (e.g., SCI-1 and/or SCI-2) or other suitable communication.

In some aspects, the first sidelink UE may transmit an additional S-SSB burst to the second sidelink UE outside of the DRS window based on a link quality between the first sidelink UE and the second sidelink UE. In some aspects, the second UE may monitor the radio link quality between the first UE and the second UE. For example, the second UE may measure the link quality (e.g., an RSRP associated with the S-SSB burst, a signal to interference plus noise ratio (SINR) associated with the S-SSB burst, or other suitable link quality measurements) and compare the link quality with a threshold value. If the link quality is below, equal to or below, and/or approaching the threshold value (e.g., trending toward the threshold value over a time period), then the second sidelink UE may transmit a request to the first sidelink UE for an additional S-SSB burst. In response to the request, the first sidelink UE may asynchronously transmit one or more additional S-SSB bursts outside of the DRS window. In some aspects, the first sidelink UE may detect a degradation in the link quality between the first sidelink UE and the second sidelink UE. For example, the first sidelink UE may receive negative acknowledgments (NACKs) from the second sidelink UE at a rate greater than or equal to a threshold. The rate of receiving NACKs (e.g., number of NACKs received over a time period) may indicate a radio link quality degradation. In response to the radio link degradation, the first sidelink UE may asynchronously transmit one or more additional S-SSB bursts to the second sidelink UE outside of the DRS window.

Figure 12:
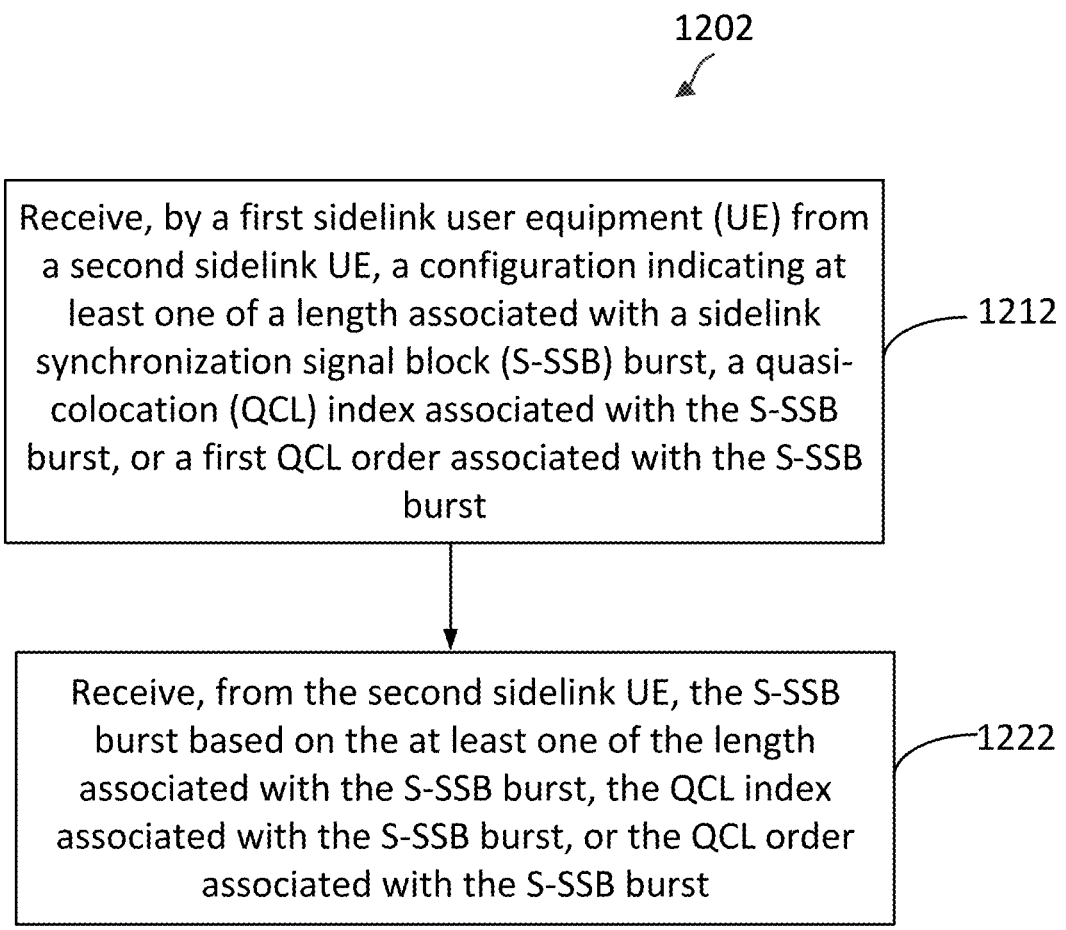
FIG. 12 is a flow diagram of a communication method according to some aspects of the present disclosure.

FIG. 12 is a flow diagram of a communication method 1202 according to some aspects of the present disclosure. Aspects of the method 1202 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the dynamic S-SSB module 908, the transceiver 910, the modem 912, and the one or more antennas 916, to execute aspects of method 1202. The method 1202 may employ similar mechanisms as in the networks 100 and 1200 and the aspects and actions described with respect to FIGS. 3-8. As illustrated, the method 1202 includes a number of enumerated aspects, but the method 1202 may include additional aspects before, after, and in between the enumerated aspects. In some aspects, one or more of the enumerated aspects may be omitted or performed in a different order.

At action 1212, the method 1202 includes a first sidelink UE (e.g., the UE 115, the UE 120, or the UE 900) receiving a configuration from a second sidelink UE. The configuration may indicate at least one of a length associated with a sidelink synchronization signal block (S-SSB) burst, a quasi-colocation (QCL) index associated with the S-SSB burst, and/or a first QCL order associated with the S-SSB burst. In this regard, the first sidelink UE may receive the configuration from the second sidelink UE via a PC5 communication, sidelink control information (e.g., SCI-1, SCI-2), a radio resource control (RRC) communication, or other suitable communication. Additionally or alternatively, the first sidelink UE may receive the configuration from a network unit (e.g., the BS 105, the CU 1210, the DU 1230, the RU 1240, and/or the network unit 1000) via downlink control information (DCI), a radio resource control (RRC) communication, or other suitable communication.

The configuration may indicate a length associated with the S-SSB burst. In this regard, the length associated with the S-SSB burst may indicate a number of contiguous slots associated with the S-SSB burst. For example, the configuration may indicate a length of 1, 2, 3, 4, 5, or more slots associated with the S-SSB burst. Additionally or alternatively, the configuration may indicate a length of 1, 2, 3, 4, 5, or more sub-slots associated with the S-SSB burst. A slot may be partitioned into multiple sub-slots. Each sub-slot may include a number of symbols (e.g., 1, 2,3, 4, or more symbols). Additionally or alternatively, the configuration may indicate a length of 1, 2, 3, 4, 5, or more symbols associated with the S-SSB burst. The slots associated with the S-SSB burst may be contiguous in time and have consecutive slot indexes. In some aspects, the length associated with the S-SSB burst may be based on a number of UEs the second sidelink UE is scheduled to transmit the S-SSB burst to.

The second sidelink UE may schedule communications (e.g., transport blocks) to be transmitted to a number of UEs (e.g., 1, 2, 3, 4, 5, or more UEs). The number of UEs may include the first sidelink UE. For example, the second sidelink UE may schedule communications to the first sidelink UE and a third sidelink UE. The second sidelink UE may establish radio links with the first sidelink UE and the third sidelink UE based on transmitting an initial S-SSB burst(s) to the first sidelink UE and the third sidelink UE. The length of the S-SSB burst(s) may include two contiguous slots (e.g., a first slot and a second slot). The first sidelink UE may receive an S-SSB burst from the second sidelink UE via the first slot to establish a radio link. By setting the length associated with the S-SSB burst(s) based on the number of UEs the second sidelink UE is scheduled to communicate with, the second sidelink UE may conserve resources (e.g., power resources, computing resources) as compared to transmitting S-SSB bursts to UEs the second sidelink UE is not scheduled to communicate with. Further, by setting the length associated with the S-SSB burst based on the number of UEs the second sidelink UE is scheduled to communicate with, the second sidelink UE may reduce potential radio interference in the wireless network (e.100 or 1200). Although the example above describes transmitting an S-SSB burst to the first sidelink UE and/or the third sidelink UE in a single slot, the present disclosure is not so limited and the second sidelink UE may transmit any number of S-SSB bursts via any number of slots to the first sidelink UE and/or to the third sidelink UE.

The configuration may indicate a QCL index associated with the S-SSB burst. In some aspects, the QCL index associated with the S-SSB burst may indicate a beam associated with the S-SSB burst. In this regard, the first sidelink UE may receive the S-SSB burst via a beam in the direction of the second sidelink UE. The second sidelink UE may be configured to transmit S-SSB bursts via multiple directional beams (e.g., 1, 2, 4, 8, or more directional beams). The QCL index may correspond to the directional beam. For example, when the second sidelink UE is configured to transmit in 8 directional beams, the QCL index may have a value between 0 and 7. The QCL index may correspond to the directional beam that provides the highest radio link quality (e.g., highest reference signal received power (RSRP)) at the first sidelink UE. The first sidelink UE may measure one or more suitable beam parameters that may be reported to the second sidelink UE. The first sidelink UE may transmit a channel state information (CSI) report associated with the directional beam that provides the highest radio link quality to the second sidelink UE. The CSI report may indicate which beamformed S-SSB burst(s) have resulted in the highest received power based on the measurements. The first sidelink UE may receive the S-SSB burst(s), and derive carrier frequency and slot timing from the S-SSB burst(s). By transmitting the S-SSB to the first sidelink UE via the directional beam that provides the highest link quality, the second sidelink UE may increase the probability of establishing and/or maintaining the radio link between the first and second sidelink UEs as compared to transmitting the S-SSB to the first sidelink UE via a directional beam that provides lower link quality.

In some aspects, the second sidelink UE may indicate the QCL index of the S-SSB burst to the first sidelink UE (and other sidelink UEs) in the same slot as the S-SSB burst. In this regard, the first sidelink UE may receive the configuration indicating the QCL index of the S-SSB burst from the second sidelink UE via SCI (e.g., SCI-1 and/or SCI-2) in symbols having lower indexes than the symbols in which the S-SSB burst is transmitted. For example, the first sidelink UE may receive the configuration indicating the QCL index of the S-SSB burst in symbol indexes 1, 2, or 3 while receiving the S-SSB burst in symbols having higher indexes (e.g., any of symbol indexes 4-13).

In some aspects, the first sidelink UE may receive the configuration comprising the QCL index associated with the S-SSB burst as a codepoint via a physical sidelink broadcast channel (PSBCH). For example, the first sidelink UE may receive the configuration comprising the QCL index as a codepoint via a PSBCH demodulation reference signal (DMRS) scrambling sequence. The codepoint be a binary number (e.g., 1, 2, 3, 4, or more bits) representing the QCL index. Additionally or alternatively, the first sidelink UE may receive the configuration comprising the QCL index as a codepoint via a PSBCH payload.

In some aspects, all bits of the codepoint may be carried by the PSBCH DMRS scrambling sequence. Additionally or alternatively, all bits of the codepoint may be carried by the PSBCH payload. In some aspects, some bits of the codepoint be carried by the PSBCH DMRS scrambling sequence while the remaining bits may be carried by the PSBCH payload. For example, the least significant bit(s) of the codepoint may be carried by the PSBCH DMRS scrambling sequence while the most significant bit(s) may be carried by the PSBCH payload. The configuration may indicate a QCL order associated with the S-SSB burst. In some aspects, the QCL order associated with the S-SSB burst may indicate an ordered sequence of beam indexes associated with the S-SSB burst. The QCL order may indicate the beam index for each of the contiguous slots carrying the S-SSB burst(s). For example, the second sidelink UE may transmit an S-SSB burst to the first sidelink UE using beam index 2 in a slot. The second sidelink UE may subsequently transmit an S-SSB burst to the third sidelink UE in a contiguous slot using beam index 0. The second sidelink UE may subsequently transmit S-SSB burst to a fourth sidelink UE in the next contiguous slot using beam index 1. In this case, the QCL order will be 0, 2, 1. As another example, the second sidelink UE may transmit an S-SSB burst to the first sidelink UE using beam index 3. The second sidelink UE may subsequently transmit an S-SSB burst to the third sidelink UE using beam index 5 and then transmit an S-SSB burst to a fourth sidelink UE using beam index 4. In this case, the QCL order will be 3, 5, 4.

In some instances, the second sidelink UE may perform an LBT or other clear channel assessment (CCA) prior to transmitting an S-SSB burst. For example, if the second sidelink UE performs an LBT before attempting to transmit the S-SSB burst to the first sidelink UE using beam index 3, the LBT may fail. The failure of the LBT may prevent the second sidelink UE from accessing the channel and transmitting the S-SSB to the first sidelink UE. The second sidelink UE may perform another LBT before attempting to transmit the S-SSB burst to the third sidelink UE using beam index 5. If the LBT is successful, then the second sidelink UE may proceed with transmitting the S-SSB burst to the third sidelink UE using beam index 5, then transmit another S-SSB burst to the fourth sidelink UE using beam index 4, and then transmit another S-SSB burst to the second sidelink UE using beam index 3. In this manner, the second sidelink UE may dynamically change the order of the S-SSB bursts based on whether the LBT is successful or unsuccessful. By dynamically changing the order of the S-SSB bursts to 5, 4, 3 from 3, 5, 4, the second sidelink UE may transmit the S-SSB bursts to each of the intended receiving UEs (e.g., the first, third, and/or fourth UEs) enabling initial and/or continued synchronization of the radio link(s). By transmitting the S-SSB bursts corresponding to a QCL order of 5, 4, 3 in contiguous slots, the second sidelink UE may maintain access to the channel without performing another LBT. In some aspects, the second sidelink UE may indicate the changed (e.g., updated) QCL order of the S-SSB bursts to the first sidelink UE (and other sidelink UEs) in the same slot as the S-SSB bursts. In this regard, the second sidelink UE may transmit the configuration indicating the updated QCL order of the S-SSB bursts to the first sidelink UE via SCI (e.g., SCI-1 and/or SCI-2) in symbols having lower indexes than the symbols in which the S-SSB bursts are transmitted. For example, the second sidelink UE may transmit the configuration indicating the updated QCL order of the S-SSB bursts in symbol indexes 1, 2, or 3 while transmitting the S-SSB bursts in symbols having higher indexes (e.g., any of symbol indexes 4-13).

In some aspects, the first sidelink UE may receive the configuration comprising the QCL order associated with the S-SSB burst as a codepoint via a physical sidelink broadcast channel (PSBCH). For example, the first sidelink UE may receive the configuration comprising the QCL order as a codepoint via a PSBCH demodulation reference signal (DMRS) scrambling sequence. The codepoint be a binary number (e.g., 1, 2, 3, 4, or more bits) representing the QCL order. Additionally or alternatively, the first sidelink UE may receive the configuration comprising the QCL order as a codepoint via a PSBCH payload.

In some aspects, all bits of the QCL order codepoint may be carried by the PSBCH DMRS scrambling sequence. Additionally or alternatively, all bits of the QCL order codepoint may be carried by the PSBCH payload. In some aspects, some bits of the QCL order codepoint be carried by the PSBCH DMRS scrambling sequence while the remaining bits may be carried by the PSBCH payload. For example, the least significant bit(s) of the codepoint may be carried by the PSBCH DMRS scrambling sequence while the most significant bit(s) may be carried by the PSBCH payload.

In some aspects, the configuration may further indicate a discovery reference signal (DRS) window and a DRS period. The first sidelink UE may receive SSBs in the form of SSB bursts, where an SSB burst may include a set of SSBs. The second sidelink UE may repeat the transmission of the SSB burst according to the DRS period. The DRS period may represent a periodicity at which the S-SSB burst transmissions are repeated. The DRS period may be any suitable time period. For example, the DRS period may be 5 ms, 10 ms, 20 ms, 40 ms, 80 ms, or 160 ms.

During the DRS window, the first sidelink UE may monitor for and decode the SSBs. The SSBs may include PSS, the SSS, and/or the PBCH. In some instances, the DRS window may be used to indicate when the first sidelink UE should monitor for the S-SSB burst. The DRS window may be configured as a time duration starting from the beginning of the DRS period and/or starting at an offset from the beginning of the DRS period. For example, the DRS window may be configured as 0.5 ms, 1 ms, 2 ms, 3 ms, 4 ms, 5 ms, or more.

In some aspects, the configuration may further indicate a power scaling factor. The power scaling factor may be indicated for each slot in which an S-SBB is received by the first sidelink UE. Since the second sidelink UE may multiplex the S-SSB with a PSSCH transmission in each slot, the total transmit power (e.g., maximum 23 dBm or other suitable limit) may be shared between the S-SSB and the PSSCH. The power scaling factor may indicate to the first sidelink UE how the power is shared between the S-SSB and the PSSCH. The power scaling factor may be based on the size of the PSSCH transmission (e.g., the size of the transport block carried by the PSSCH). The first sidelink UE may use the power scaling factor when monitoring for S-SSB bursts during an initial radio link connection to the second sidelink UE and/or during radio link monitoring to maintain the radio link with the second sidelink UE.

At action 1222, the method 1202 includes the first sidelink UE (e.g., the UE 115, the UE 120, or the UE 900) receiving the S-SSB burst from the second sidelink UE. The first sidelink UE may receive the S-SSB burst based on at least one of the length associated with the S-SSB burst, the QCL index associated with the S-SSB burst, and/or the first QCL order associated with the S-SSB burst. The first sidelink UE may receive the S-SSB burst from the second sidelink UE in an unlicensed frequency spectrum (e.g., a shared frequency spectrum). In this regard, the second sidelink UE may perform a listen-before-talk (LBT) procedure to gain access to the channel in the unlicensed frequency spectrum. For example, the second sidelink UE may perform a category 2 LBT, a category 3, LBT and/or a category 4 LBT to gain access to the channel in the unlicensed frequency spectrum. In some instances, the QCL order may be based on the success and/or failure of one or more LBTs. For example, if an LBT is successful, then the second sidelink UE may transmit the S-SSB burst(s) in a number of contiguous slots indicated by the length associated with the S-SSB burst. The order of the S-SSB burst transmissions may be based on the first QCL order indicated by the second sidelink UE. If the LBT is unsuccessful, then the second sidelink UE may wait a period of time (e.g., backoff time period) to perform another LBT. For example, the second sidelink UE may wait until an offset from the next slot boundary to perform another LBT. If the subsequent LBT is successful, then the second sidelink UE may transmit an additional configuration indicating a second QCL order for the S-SSB burst. The second QCL order may be different from the first QCL order. For example, the first sidelink UE may receive an initial configuration indicating the first QCL order (e.g., 3, 5, 4). The first QCL order may be based on a first LBT being successful. The first sidelink UE may receive an updated configuration indicating the second QCL order (e.g., 5, 4, 3) based on the first LBT being unsuccessful and a second LBT being successful. In some aspects, if the first and second LBTs are unsuccessful, then the first sidelink UE may receive an updated configuration indicating a third CQL order (e.g., 4, 3, 5) based on a third LBT being successful.

In some aspects, the first sidelink UE may receive the S-SSB burst based on a multiple of the DRS period. The second sidelink UE may conserve resources (e.g., power resources and/or computing resources) by transmitting the S-SSB burst based on a multiple (e.g., an integer multiple greater than 1) of the DRS period as compared to transmitting the S-SSB burst based on the DRS period. The second sidelink UE may transmit S-SBB burst(s) to establish an initial radio link with the first sidelink UE and other sidelink UEs. For example, during initial radio link establishment the second sidelink UE may transmit S-SSB bursts on all and/or a subset of the beams the second sidelink UE is configured to transmit on at a multiple of the DRS period. After establishing the radio link, the second sidelink UE may transmit S-SSB bursts on beams that have established links to other sidelink UEs in order to maintain the radio links. In some aspects, the first sidelink UE or other sidelink UEs may detect a degradation of the radio link with the second sidelink UE and transmit a request to the second sidelink UE for a more frequent transmission of the S-SSB bursts (e.g., a lower multiple of the DRS period). The first sidelink UE may transmit the request to the second sidelink UE for more frequent S-SSB burst transmissions via SCI (e.g., SCI-1 and/or SCI-2) or other suitable communication.

In some aspects, the first sidelink UE may receive an additional S-SSB burst from the second sidelink UE outside of the DRS window based on a link quality between the first sidelink UE and the second sidelink UE. In some aspects, the first UE may monitor the radio link quality between the first UE and the second UE. For example, the first UE may measure the link quality (e.g., an RSRP associated with the S-SSB burst, a signal to interference plus noise ratio (SINR) associated with the S-SSB burst, or other suitable link quality measurements) and compare the link quality with a threshold value. If the link quality is below, equal to or below, and/or approaching the threshold value (e.g., trending toward the threshold value over a time period), then the first sidelink UE may transmit a request to the second sidelink UE for an additional S-SSB burst. In response to the request, the second sidelink UE may asynchronously transmit one or more additional S-SSB bursts outside of the DRS window. In some aspects, the second sidelink UE may detect a degradation in the link quality between the first sidelink UE and the second sidelink UE. For example, the second sidelink UE may receive negative acknowledgments (NACKs) from the first sidelink UE at a rate greater than or equal to a threshold. The rate of receiving NACKs (e.g., number of NACKs received over a time period) may indicate a radio link quality degradation. In response to the radio link degradation, the first sidelink UE may asynchronously receive one or more additional S-SSB bursts from the second sidelink UE outside of the DRS window.

Further aspects of the present disclosure include the following:

Aspect 1 includes a method of wireless communication performed by a first sidelink user equipment (UE), the method comprising transmitting, to a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst and transmitting, to the second sidelink UE, the S-SSB burst based on the at least one of the length associated with the S-SSB burst, the QCL index associated with the S-SSB burst, or the first QCL order associated with the S-SSB burst.

Aspect 2 includes the method of aspect 1, wherein the configuration indicates the length associated with the S-SSB burst; and the length associated with the S-SSB burst indicates a number of contiguous slots associated with the S-SSB burst.

Aspect 3 includes the method of any of aspects 1-2, wherein the configuration indicates the length associated with the S-SSB burst; and the length associated with the S-SSB burst is based on a number of UEs the first sidelink UE is scheduled to transmit the S-SSB burst to.

Aspect 4 includes the method of any of aspects 1-3, wherein the configuration indicates the QCL index associated with the S-SSB burst; and the QCL index associated with the S-SSB burst indicates a beam associated with the S-SSB burst.

Aspect 5 includes the method of any of aspects 1-4, the configuration indicates the first QCL order associated with the S-SSB burst; and the first QCL order associated with the S-SSB burst indicates an ordered sequence of beam indexes associated with the S-SSB burst.

Aspect 6 includes the method of any of aspects 1-5, wherein the transmitting the configuration comprises transmitting the QCL index associated with the S-SSB burst via sidelink control information (SCI).

Aspect 7 includes the method of any of aspects 1-6, wherein the transmitting the configuration comprises transmitting the QCL index associated with the S-SSB burst via a physical sidelink broadcast channel (PSBCH).

Aspect 8 includes the method of any of aspects 1-7, wherein the transmitting the QCL index associated with the S-SSB burst via the PSBCH comprises transmitting the QCL index via at least one of a PSBCH demodulation reference signal (DMRS) scrambling sequence; or a PSBCH payload.

Aspect 9 includes the method of any of aspects 1-8, further comprising performing a listen-before-talk (LBT) procedure, wherein the transmitting the S-SSB burst comprises at least one of transmitting the S-SSB burst according to the first QCL order based on the LBT procedure being successful; or transmitting the S-SSB burst according to a second QCL order based on the LBT procedure being unsuccessful, wherein the second QCL order is different from the first QCL order.

Aspect 10 includes the method of any of aspects 1-9, wherein the configuration further indicates a discovery reference signal (DRS) window; and a DRS period.

Aspect 11 includes the method of any of aspects 1-10, wherein the transmitting the S-SSB burst comprises transmitting the S-SSB burst based on a multiple of the DRS period.

Aspect 12 includes the method of any of aspects 1-11, further comprising transmitting, to the second sidelink UE, an additional S-SSB burst outside of the DRS window based on a link quality between the first sidelink UE and the second sidelink UE.

Aspect 13 includes the method of any of aspects 1-12, wherein the transmitting the configuration comprises transmitting the configuration via sidelink radio resource control (RRC) signaling.

Aspect 14 includes the method of any of aspects 1-13, wherein the configuration further indicates a power scaling factor; and the transmitting the S-SSB burst comprises transmitting the S-SSB burst further based on the power scaling factor.

Aspect 15 includes method of wireless communication performed by a first sidelink user equipment (UE), the method comprising receiving, from a second sidelink UE, a configuration indicating at least one of a length associated with a sidelink synchronization signal block (S-SSB) burst, a quasi-colocation (QCL) index associated with the S-SSB burst, or a first QCL order associated with the S-SSB burst; and receiving, from the second sidelink UE, the S-SSB burst based on the at least one of the length associated with the S-SSB burst, the QCL index associated with the S-SSB burst, or the QCL order associated with the S-SSB burst.

Aspect 16 includes the method of aspect 15, wherein the configuration indicates the length associated with the S-SSB burst; and the length associated with the S-SSB burst indicates a number of contiguous slots associated with the S-SSB burst.

Aspect 17 includes the method of any of aspects 15-16, wherein the configuration indicates the length associated with the S-SSB burst; and the length associated with the S-SSB burst is based on a number of UEs the second sidelink UE is scheduled to transmit the S-SSB burst to.

Aspect 18 includes the method of any of aspects 15-17, wherein the configuration indicates the QCL index associated with the S-SSB burst; and the QCL index associated with the S-SSB burst indicates a beam associated with the S-SSB burst.

Aspect 19 includes the method of any of aspects 15-18, wherein the configuration indicates the first QCL order associated with the S-SSB burst; and the first QCL order associated with the S-SSB burst indicates an ordered sequence of beam indexes associated with the S-SSB burst.

Aspect 20 includes the method of any of aspects 15-19, wherein the receiving the configuration comprises receiving the QCL index associated with the S-SSB burst via sidelink control information (SCI).

Aspect 21 includes the method of any of aspects 15-20, wherein the receiving the configuration comprises receiving the QCL index associated with the S-SSB burst via a physical sidelink broadcast channel (PSBCH).

Aspect 22 includes the method of any of aspects 15-21, wherein the receiving the QCL index associated with the S-SSB burst via the PSBCH comprises receiving the QCL index via at least one of a PSBCH demodulation reference signal (DMRS) scrambling sequence; or a PSBCH payload.

Aspect 23 includes the method of any of aspects 15-22, wherein the receiving the S-SSB burst comprises at least one of receiving the S-SSB burst according to the first QCL order based on a successful listen-before-talk (LBT) procedure by the second sidelink UE; or receiving the S-SSB burst according to a second QCL order based on based on an unsuccessful LBT procedure by the second sidelink UE, wherein the second QCL order is different from the first QCL order.

Aspect 24 includes the method of any of aspects 15-23, wherein the configuration further indicates a discovery reference signal (DRS) window; and a DRS period.

Aspect 25 includes the method of any of aspects 15-24, wherein the receiving the S-SSB burst comprises receiving the S-SSB burst based on a multiple of the DRS period.

Aspect 26 includes the method of any of aspects 15-25, further comprising receiving, from the second sidelink UE, an additional S-SSB burst outside of the DRS window based on a link quality between the first sidelink UE and the second sidelink UE.

Aspect 27 includes the method of any of aspects 15-26, wherein the receiving the configuration comprises receiving the configuration via sidelink radio resource control (RRC) signaling.

Aspect 28 includes the method of any of aspects 15-27, wherein the receiving the configuration comprises receiving the configuration via sidelink radio resource control (RRC) signaling.

Aspect 29 includes a non-transitory computer-readable medium storing one or more instructions for wireless communication, the one or more instructions comprising one or more instructions that, when executed by one or more processors of a first sidelink (UE), cause the first sidelink UE to perform any one of aspects 1-14.

Aspect 30 includes a non-transitory computer-readable medium storing one or more instructions for wireless communication, the one or more instructions comprising one or more instructions that, when executed by one or more processors of a first sidelink user equipment (UE), cause the first sidelink UE to perform any one of aspects 15-28.

Aspect 31 includes a first sidelink user equipment (UE) comprising one or more means to perform any one or more of aspects 1-14.

Aspect 32 includes a first sidelink user equipment (UE) comprising one or more means to perform any one or more of aspects 15-28.

Aspect 33 includes a first sidelink user equipment (UE) comprising a memory, a transceiver, and at least one processor coupled to the memory and the transceiver, wherein the first sidelink UE is configured to perform any one or more of aspects 1-14.

Aspect 34 includes a first sidelink user equipment (UE) comprising a memory, a transceiver, and at least one processor coupled to the memory and the transceiver, wherein the first sidelink UE is configured to perform any one or more of aspects 15-28.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an

What is claimed is:

1. A method of wireless communication performed at a first sidelink user equipment (UE), the method comprising:
   transmitting, to a second sidelink UE, a configuration indicating a discovery reference signal (DRS) period, a DRS window within the DRS period with a plurality of candidate S-SSB resources and at least one of a length associated with a sidelink synchronization signal block (S-SSB) burst, a quasi-colocation (QCL) index associated with the S-SSB burst, or a first QCL order associated with the S-SSB burst, the configuration indicating the length associated with the S-SSB burst and wherein the length associated with the S-SSB burst is based on a number of UEs the first sidelink UE is scheduled to transmit the S-SSB burst to; and
   transmitting, to the second sidelink UE, the S-SSB burst at a S-SSB resource of the plurality of candidate S-SSB resources based on the at least one of the length associated with the S-SSB burst, the QCL index associated with the S-SSB burst, or the first QCL order associated with the S-SSB burst.

2. The method of claim 1, wherein:
   the configuration indicates the length associated with the S-SSB burst; and
   the length associated with the S-SSB burst indicates a number of contiguous slots associated with the S-SSB burst.

3. The method of claim 1, wherein:
   the configuration indicates the QCL index associated with the S-SSB burst; and
   the QCL index associated with the S-SSB burst indicates a beam associated with the S-SSB burst.

4. The method of claim 1, wherein:
   the configuration indicates the first QCL order associated with the S-SSB burst; and
   the first QCL order associated with the S-SSB burst indicates an ordered sequence of beam indexes associated with the S-SSB burst.

5. The method of claim 1, wherein the transmitting the configuration comprises at least one of:
   transmitting the QCL index associated with the S-SSB burst via sidelink control information (SCI); or
   transmitting the QCL index associated with the S-SSB burst via a physical sidelink broadcast channel (PSBCH).

6. The method of claim 5, wherein the transmitting the QCL index associated with the S-SSB burst via the PSBCH comprises transmitting the QCL index via at least one of:
   a PSBCH demodulation reference signal (DMRS) scrambling sequence; or
   a PSBCH payload.

7. The method of claim 1, further comprising performing a listen-before-talk (LBT) procedure, wherein the transmitting the S-SSB burst comprises at least one of:
   transmitting the S-SSB burst according to the first QCL order based on the LBT procedure being successful; or
   transmitting the S-SSB burst according to a second QCL order based on the LBT procedure being unsuccessful, wherein the second QCL order is different from the first QCL order.

8. The method of claim 1, wherein the configuration further indicates:
   the DRS window starting at an offset from a beginning of the DRS period.

9. The method of claim 8, wherein the transmitting the S-SSB burst comprises transmitting the S-SSB burst based on a multiple of the DRS period.

10. The method of claim 1, further comprising:
    transmitting, to the second sidelink UE, an additional S-SSB burst outside of the DRS window based on a link quality between the first sidelink UE and the second sidelink UE.

11. The method of claim 1, wherein the transmitting the configuration comprises transmitting the configuration via sidelink radio resource control (RRC) signaling.

12. The method of claim 1, wherein:
    the configuration further indicates a power scaling factor; and
    the transmitting the S-SSB burst comprises transmitting the S-SSB burst further based on the power scaling factor.

13. A method of wireless communication performed at a first sidelink user equipment (UE), the method comprising:
    receiving, from a second sidelink UE, a configuration indicating a discovery reference signal (DRS) period, a DRS window within the DRS period with a plurality of candidate S-SSB resources and at least one of a length associated with a sidelink synchronization signal block (S-SSB) burst, a quasi-colocation (QCL) index associated with the S-SSB burst, or a first QCL order associated with the S-SSB burst, the configuration indicating the length associated with the S-SSB burst, and wherein the length associated with the S-SSB burst is based on a number of UEs the second sidelink UE is scheduled to transmit the S-SSB burst to; and
    receiving, from the second sidelink UE, the S-SSB burst at a S-SSB resource of the plurality of candidate S-SSB resources based on the at least one of the length associated with the S-SSB burst, the QCL index associated with the S-SSB burst, or the QCL order associated with the S-SSB burst.

14. The method of claim 13, wherein:
    the configuration indicates the length associated with the S-SSB burst; and
    the length associated with the S-SSB burst indicates a number of contiguous slots associated with the S-SSB burst.

15. The method of claim 13, wherein:
    the configuration indicates the QCL index associated with the S-SSB burst; and
    the QCL index associated with the S-SSB burst indicates a beam associated with the S-SSB burst.

16. The method of claim 13, wherein:
    the configuration indicates the first QCL order associated with the S-SSB burst; and
    the first QCL order associated with the S-SSB burst indicates an ordered sequence of beam indexes associated with the S-SSB burst.

17. A first sidelink user equipment (UE) comprising:
a memory;
a transceiver; and
at least one processor coupled to the memory and the transceiver, wherein the first sidelink UE is configured to:
 transmit, to a second sidelink UE, a configuration indicating a discovery reference signal (DRS) period, a DRS window within the DRS period with a plurality of candidate S-SSB resources and at least one of a length associated with a sidelink synchronization signal block (S-SSB) burst, a quasi-colocation (QCL) index associated with the S-SSB burst, or a first QCL order associated with the S-SSB burst, the configuration indicating the length associated with the S-SSB burst, and wherein the length associated with the S-SSB burst is based on a number of UEs the first sidelink UE is scheduled to transmit the S-SSB burst to; and
 transmit, to the second sidelink UE, the S-SSB burst at a S-SSB resource of the plurality of candidate S-SSB resources based on the at least one of the length associated with the S-SSB burst, the QCL index associated with the S-SSB burst, or the first QCL order associated with the S-SSB burst.

18. The first sidelink UE of claim 17, wherein:
the configuration indicates the length associated with the S-SSB burst; and
the length associated with the S-SSB burst indicates a number of contiguous slots associated with the S-SSB burst.

19. The first sidelink UE of claim 17, wherein:
the configuration indicates the QCL index associated with the S-SSB burst; and
the QCL index associated with the S-SSB burst indicates a beam associated with the S-SSB burst.

20. The first sidelink UE of claim 17, wherein:
the configuration indicates the first QCL order associated with the S-SSB burst; and
the first QCL order associated with the S-SSB burst indicates an ordered sequence of beam indexes associated with the S-SSB burst.

21. The first sidelink UE of claim 17, wherein the first sidelink UE is further configured to:
perform a listen-before-talk (LBT) procedure; and
transmit the S-SSB burst according to the first QCL order based on the LBT procedure being successful; or
transmit the S-SSB burst according to a second QCL order based on the LBT procedure being unsuccessful, wherein the second QCL order is different from the first QCL order.

22. The first sidelink UE of claim 17, wherein:
the configuration further indicates a power scaling factor; and
the first sidelink UE is further configured to:
 transmit the S-SSB burst further based on the power scaling factor.

23. A first sidelink user equipment (UE) comprising:
a memory;
a transceiver; and
at least one processor coupled to the memory and the transceiver, wherein the first sidelink UE is configured to:
 receive, from a second sidelink UE, a configuration indicating a discovery reference signal (DRS) period, a DRS window within the DRS period with a plurality of candidate S-SSB resources and at least one of a length associated with a sidelink synchronization signal block (S-SSB) burst, a quasi-colocation (QCL) index associated with the S-SSB burst, or a first QCL order associated with the S-SSB burst, the configuration indicating the length associated with the S-SSB burst, and wherein the length associated with the S-SSB burst is based on a number of UEs the second sidelink UE is scheduled to transmit the S-SSB burst to; and
 receive, from the second sidelink UE, the S-SSB burst at a S-SSB resource of the plurality of candidate S-SSB resources based on the at least one of the length associated with the S-SSB burst, the QCL index associated with the S-SSB burst, or the QCL order associated with the S-SSB burst.

24. The first sidelink UE of claim 23, wherein:
the configuration indicates the length associated with the S-SSB burst; and
the length associated with the S-SSB burst indicates a number of contiguous slots associated with the S-SSB burst.

25. The first sidelink UE of claim 23, wherein:
the configuration indicates the QCL index associated with the S-SSB burst; and
the QCL index associated with the S-SSB burst indicates a beam associated with the S-SSB burst.

26. The first sidelink UE of claim 23, wherein:
the configuration indicates the first QCL order associated with the S-SSB burst; and
the first QCL order associated with the S-SSB burst indicates an ordered sequence of beam indexes associated with the S-SSB burst.

* * * * *